United States Patent
Wlaschin

(10) Patent No.: US 6,182,121 B1
(45) Date of Patent: *Jan. 30, 2001

(54) METHOD AND APPARATUS FOR A PHYSICAL STORAGE ARCHITECTURE HAVING AN IMPROVED INFORMATION STORAGE AND RETRIEVAL SYSTEM FOR A SHARED FILE ENVIRONMENT

(75) Inventor: Scott Wlaschin, Los Angeles, CA (US)

(73) Assignee: Enfish, Inc., Pasadena, CA (US)

( * ) Notice: Under 35 U.S.C. 154(b), the term of this patent shall be extended for 0 days.

This patent is subject to a terminal disclaimer.

(21) Appl. No.: 09/128,922

(22) Filed: Aug. 4, 1998

Related U.S. Application Data

(63) Continuation-in-part of application No. 08/633,839, filed on Apr. 10, 1996, now Pat. No. 5,850,522, which is a continuation-in-part of application No. 08/384,706, filed on Feb. 3, 1995, now Pat. No. 5,790,848, said application No. 09/128,922, is a continuation-in-part of application No. 08/633,842, filed on Apr. 10, 1996, now Pat. No. 5,893,087, which is a continuation-in-part of application No. 08/383,752, filed on Mar. 28, 1995, now Pat. No. 5,729,730.

(51) Int. Cl.[7] .................................................. G06F 15/167
(52) U.S. Cl. .................................. 709/215; 707/1; 707/3; 707/4; 707/8; 707/10; 707/207; 711/153; 711/173
(58) Field of Search ................................. 707/10, 8, 201, 707/3, 1, 4; 711/153, 173; 709/215

(56) References Cited

U.S. PATENT DOCUMENTS 4,980,822 * 12/1990 Brantley, Jr. et al. .
5,359,724 * 10/1994 Earle ....................................... 707/205
5,535,375 * 7/1996 Eshel et al. ........................... 395/500
5,729,730 * 3/1998 Wlaschin et al. ......................... 707/3
5,850,522 * 12/1998 Wlaschin .............................. 709/215

* cited by examiner

Primary Examiner—Glenn A. Auve
Assistant Examiner—Rupal D. Dharia
(74) Attorney, Agent, or Firm—Morrison & Foerster LLP

(57) ABSTRACT

A distributed storage system provides a method and apparatus for storing, retrieving, and sharing data items across multiple physical storage devices that may not always be connected with one another. The present invention comprises one or more 'partitions' on distinct storage devices, with each partition comprising of a group of associated data files. Partitions can be of various types, and the partitions of the various clients may, at various times, be merged into a consolidation file or a file resident within another partition. The system resolves conflicts between two or more clients to determine which updates, if any, should be stored in a library partition. The flexible, self-referential table of the present invention may store any type of data, both structured and unstructured, and provides an interface to other application programs. The table of the present invention comprises a plurality of rows and columns. Each row has an object identification number (OID) and each column also has an OID. A row corresponds to a record and a column corresponds to a field such that the intersection of a row and a column comprises a cell that may contain data for a particular record related to a particular field, a cell may also point to another record. To enhance searching and to provide for synchronization between columns, columns are entered as rows in the table and the record corresponding to a column contains various information about the column. The table includes an index structure for extended queries.

1 Claim, 37 Drawing Sheets

| OBJECT ID 420 | TYPE [#101] 422 | [#1012] LABEL 423 | ADDRESS [#1013] | EMPLOYED BY [#1019] 415 | TITLE [#1033] | AUTHOR [#1032] |
|---|---|---|---|---|---|---|
| #1100 | #1020 413 [COMPANY] | DEXIS | 117 EAST COLORADO | | 414 N/A | N/A |
| #1101 | #1010 [PERSON] | SCOTT WLASCHIN | | 412 #1100 [DEXIS] | N/A | N/A |
| #1118 | #1030 [BOOK] | | | | | #1122 |
| #1122 | #1050 [MEMO] | | | | | #1122 |
| #1127 | #1060 [DOCUMENT] | | c:\word\proj.doc | | PROJECT PLAN | #1101 |
| #1019 | #210 417 [FIELD] | EMPLOYED BY | | | | |
| #210 | #111 [TYPE] | COLUMN | | | | |
| #111 | #111 [TYPE] | TYPE | | | | |

FIG.15

| OID | #101 [TYPE] | #2 [LABEL] | #1013 [ADDRESS] | #1019 [EMPLOYED BY] | #801 [RECORD CONTENTS] |
|---|---|---|---|---|---|
| #801 | COLUMN | RECORD CONTENTS | NA | NA | |
| #1100 | COMPANY | DEXIS | 117 E COLORADO | NA | 2 [LABEL]; 101 TYPE; 301 [PARENT FOLDER]; 1022 [COMPANY]; 1023 [TYPE OF BUSINESS]; 1013 [ADDRESS]; 1014 [CITY]; 1015 [STATE]; 1017 [PHONE]; 4 [COMMENT]. |
| #1101 | PERSON | SCOTT WLASCHIN | 777 N CHESTER | #1100 | 2 [LABEL]; 101 TYPE; 301 [PARENT FOLDER]; 1012 [NAME]; 1013 [ADDRESS]; 1014 [CITY]; 1015 [STATE]; 4 [COMMENT]; 1019 [EMPLOYED BY] |
| #1118 | BOOK | 1984 | NA | NA | 2 [LABEL]; 101 TYPES 301 [PARENT FOLDER]; 1033 [TITLE]; 1032 [AUTHOR]; 4 [COMMENT] |

FIG. 20

| Objectid | #101 [TYPE] | #2 [LABEL] | #301 [PARENT FOLDER] | #320 [FOLDER CHILDREN] |
|---|---|---|---|---|
| #301 | FIELD | PARENT FOLDER | NA | NA |
| #320 | FIELD | FOLDER CHILDREN | NA | NA |
| #1100 | COMPANY | DEXIS | #1070 [CONTACTS] | NA |
| #1101 | PERSON | SCOTT WLASCHIN | #1070 [CONTACTS] 490A | NA |
| #1070 | FOLDER | CONTACTS | NA | 1100 [DEXIS]; 1101 [SCOTT WLASCHIN]; 1102 [LOUISE WANNIER]; etc. |

DEFINITIONS FOR FOLDER RELATED COLUMNS

FOLDER CHILDREN IN USE AS AN ATTRIBUTE OF A FOLDER OBJECT — 492

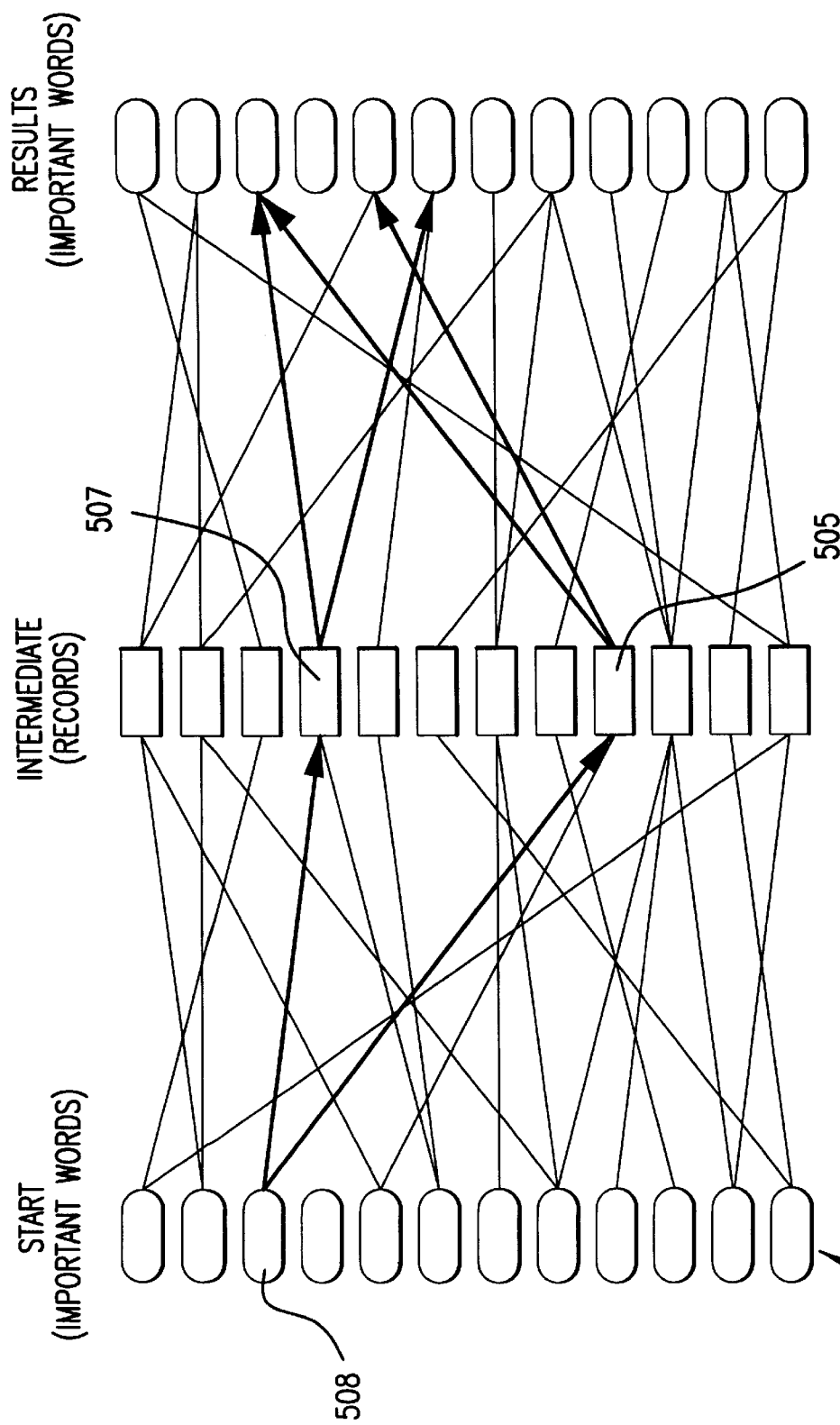

| OID | #101 [CLASS ID] | #2 [LABEL] | #621 [PARENT CONCEPT] | #701 [CONCEPT NAME] | #702 [SYNONYMS] | #703 [MORE SPECIFIC TERMS] | #704 [MORE GENERAL TERMS] | #705 [SEE ALSO] |
|---|---|---|---|---|---|---|---|---|
| 1203 | TERM | IBM | #1300 [IBM] | | | | | |
| 1204 | TERM | INTERNATIONAL BUSINESS MACHINES | #1300 [IBM] | | | | | |
| 1300 | CONCEPT | IBM | | #1203 [IBM] | #1203 [IBM]; #1204 [INTERNATIONAL BUSINESS MACHINES] | #1301 [IBM PC] WEIGHT=100% | #1303 [COMPUTER COMPANIES], WEIGHT=60% | #1302 [MICROSOFT], WEIGHT=70% |
| 1301 | CONCEPT | IBM PC | | | #1300 [IBM], WEIGHT=50% | | | |
| 1302 | CONCEPT | MICROSOFT | | | | | | |
| 1303 | CONCEPT | COMPUTER COMPANIES | | | | | #1300 [IBM], WEIGHT=100% | #1300 [IBM], WEIGHT=70% |

FIG. 28

RECORD #1103

HTML IS A STANDARD FOR HYPERTEXT

START=1, STOP=5 RECORDID= #1107

RECORD #1107

TITLE: ABOUT HTML
HTML STANDS FOR HyperText Markup Language

FIG.29
PRIOR ART

RECORD #1103

HTML IS A STANDARD FOR HYPERTEXT

START=1, STOP=5 TERMID= #1207

541

TERM #1207
LABEL: CELLIDS
HTML: #1107:2; #1108:1002;   — 542

RECORD #1107

TITLE: ABOUT HTML
HTML STANDS FOR HyperText Markup Language    — 543

RECORD #1108

ANOTHER NOTE ABOUT HTML

FIG.30

| KEY PHRASE | SORTED UNDER |
|---|---|
| 100 | '1' |
| 1984 | '1' THEN '9' |
| 20 | '2' THEN '0' |
| 3 | '3' |
| JOHN SMITH | 'J' |
| THE BIG OAK | 'T' |

FIG.33A
PRIOR ART

| KEY PHRASE | SORTED UNDER |
|---|---|
| 3 | 3 |
| 20 | 20 |
| 100 | 100 |
| 1984 | 1984 |
| THE BIG OAK | 'B'-BIG |
| JOHN SMITH | 'J'-JOHN |
| 1984 | 'N'-NINETEEN EIGHTY FOUR |
| THE BIG OAK | 'O'-OAK |
| 100 | 'O'-ONE HUNDRED |
| 1984 | 'O'-ONE THOUSAND NINE HUNDRED... |
| JOHN SMITH | 'S'-SMITH |
| 3 | 'T'-THREE |
| 20 | 'T'-TWENTY |
| 2 | 'T'-TWO |

FIG.33B

PRIOR ART

FIG. 34
PRIOR ART

| WHEN | COMMENT |
|---|---|
| 12/1/94 | |
| MEET WITH JOHN NEXT MONDAY | |
| CHRISTMAS | |
| | CALL TOMORROW |
| JAN 1 | |

IMPORTANT DATES

DEC 1
DEC 24
DEC 25
DEC 30
JAN 1

METHOD AND APPARATUS FOR A PHYSICAL STORAGE ARCHITECTURE HAVING AN IMPROVED INFORMATION STORAGE AND RETRIEVAL SYSTEM FOR A SHARED FILE ENVIRONMENT

REFERENCE TO RELATED APPLICATIONS

The present application is a Continuation-in-Part of application Ser. No. 08/633,839, now U.S. Pat. No. 5,850,522 entitled "System for Physical Storage Architecture Providing Simultaneous Access to Common File by Storing Update Data in Update Partitions and Merging Desired Updates into Common Partition" filed Apr. 10, 1996, issued Dec. 15, 1998 which is a Continuation-in-Part of the application entitled "Method and Apparatus for a Physical Storage Architecture for a Shared File Environment" filed Feb. 3, 1995, U.S. Pat. No. 5,790,848, Ser. No. 08/384,706. The present application is also a Continuation-In-Part of the application entitled "Method and Apparatus for Improved Information Storage and Retrieval System" filed April 10, 1996, U.S. Pat. No. 5,893,087, Ser. No. 08/633,842 which is a Continuation-In-Part of application Ser. No. 08/383,752, now U.S. Pat. No. 5,729,730 the application entitled "Method and Apparatus for Improved Information Storage and Retrieval System" filed Mar. 28, 1995, issued Mar. 17, 1998.

BACKGROUND OF THE INVENTION

1. Field of the Invention

The present invention relates generally to a method and apparatus for storing, retrieving, and distributing various kinds of data. More specifically, the present invention relates to a physical storage architecture for a shared file environment and method for using such.

2. Art Background

Over the last 30 years, computers have become increasingly important in storing and managing information. This has lead, in turn, to the widespread sharing and communication of data such as electronic mail and documents over computer networks. To support the sharing of data, client-server architectures have become increasingly commonplace which allow users to access files on a server. In particular, it has become common to enable many users to access the same database that resides in a server or servers.

Most current database architectures are designed for continuous access to a single set of data files. The single set of files can be shared directly or indirectly as in a client-server network. This approach encounters difficulties when users at many physical sites need to access the same data simultaneously at different client computers.

There are three common approaches to the problem of simultaneous access. According to the first approach, all the users must access a single site, typically a computer mainframe. According to the second approach, each site has an exact copy of the data at the other sites, all of which copies are kept synchronized in real-time using algorithms such as two-phase commit. The third method dictates that each site has a copy of the data at the other sites, that the copies are not always the same, and a synchronization of the copies must occur at some regular interval. This is known as a synchronous replication.

Current database architectures are designed for continuous access to all data files, and hence work well with the mainframe and two-phase commit approach. In situations when continuous access is not guaranteed, however, the systems operating according to these approaches do not function properly.

Client-server systems designed for desktop information management and local area networks uniformly use one of the first two approaches described above. These approaches tend to provide an imbalanced load on the server and typically require locking of the shared files on the remote server which further hampers performance. In addition, the files resident on the server typically require a connection to the client and thus updates may not occur without such a connection. The first two approaches also tend to be relatively slow for updates as updates must be synchronized in real-time.

The present invention overcomes the limitations of the prior art by providing a flexible, efficient and fast physical storage system that combines the advantages of a synchronous replication with the need for direct access to central data. It is designed to be used as a file system that allows users to share files on networks and across different storage media such as hard-drives, CD-ROMS and WORM drives.

Current physical storage systems suffer from limitations in addition to the synchronization problems previously discussed. A physical storage system must store data items, such as a database record, in a non-volatile memory until such time as an application requires access to such data. This process typically involves 'flattening' the contents of data items and writing them to the storage medium. The storage medium is generally divided into fixed size blocks, each of which has a location.

According to prior art storage systems, there are two restrictions that can ease the design of such a system. The first restriction is that each data item be a fixed length. The second restriction is that only the most recent version of each data item need be stored. Prior art storage systems generally operate according to one or both of these restrictions. In a typical storage system, a block of memory is found that is large enough to hold a data item, which is then written to that block. When an item is deleted, the other items in the block are reorganized to free up the maximum amount of space, ready for another data item. A new block is created only when no existing block has enough space for a new data item.

The prior art approach has numerous disadvantages. Prior art systems do not readily support variable length data and previous versions of a data item are not available, so that no 'undo' function is available to the user. Further, the prior art methods may not be used in conjunction with append-only media such as write-once read-many (WORM) disks.

As will be described, the present invention overcomes the limitations of prior art storage systems by providing a system that easily supports variable length data items without erasing older versions of data items while occupying a relative minimum of disk space.

Many database products have been developed to allow users to store and manipulate information and to search for desired information. The continuing growth of the information industry creates a demand for more powerful databases.

The database products have evolved over time. Initially, databases comprised a simple "flat file" with an associated index. Application programs, as opposed to the database program itself, managed the relationships between these files and a user typically performed queries entirely at the application program level. The introduction of relational database systems shifted many tasks from applications programs to database programs. The currently existing database management systems comprise two main types, those that follow the relational model and those that follow the object oriented model.

The relational model sets out a number of rules and guidelines for organizing data items, such as data normalization. A relational database management system (RDBMS) is a system that adheres to these rules. RDBMS databases require that each data item be uniquely classified as a particular instance of a 'relation'. Each set of relations is stored in a distinct 'table'. Each row in the table represents a particular data item, and each column represents an attribute that is shared over all data items in that table.

The pure relational model places number of restrictions on data items. For example, each data item cannot have attributes other than those columns described for the table. Further, an item cannot point directly to another item. Instead, 'primary keys' (unique identifiers) must be used to reference other items. Typically, these restrictions cause RDBMS databases to include a large number of tables that require a relatively large amount of time to search. Further, the number of tables occupies a large amount of computer memory.

The object oriented database model, derived from the object-oriented programming model, is an alternative to the relational model. Like the relational model, each data item must be classified uniquely as belonging to a single class, which defines its attributes. Key features of the object-oriented model are: 1) each item has a unique system-generated object identification number that can be used for exact retrieval; 2) different types of data items can be stored together; and 3) predefined functions or behavior can be created and stored with a data item.

Apart from the limitations previously described, both the relational and object oriented models share important limitations with regard to data structures and searching. Both models require data to be input according to a defined field structure and thus do not completely support full text data entry. Although some databases allow records to include a text field, such text fields are not easily searched. The structural requirements of current databases require a programmer to predefine a structure and subsequent date entry must conform to that structure. This is inefficient where it is difficult to determine the structure of the data that will be entered into a database.

Conversely, word and image processors that allow unstructured data entry do not provide efficient data retrieval mechanisms and a separate text retrieval or data management tool is required to retrieve data. Thus, the current information management systems do not provide the capability of integrating full text or graphics data entry with the searching mechanisms of a database.

The separation of database from other programs such as word processors has created a large amount of text and other files that cannot be integrated with current databases. Various database, spreadsheet, image, word processing, electronic mail and other types of files may not currently be accessed in a single database that contains all of this information. Various programs provide integration between spreadsheet, word processing and database programs but, as previously described, current databases do not support effective searching in unstructured files.

The present invention overcomes the limitations of both the relational database model and object oriented database model by providing a database with increased flexibility, faster search times and smaller memory requirements and that supports text attributes. Further, the database of the present invention does not require a programmer to preconfigure a structure to which a user must adapt data entry. Many algorithms and techniques are required by applications that deal with these kinds of information. The present invention provides for the integration, into a single database engine, of support for these techniques, and shifts the programming from the application to the database, as will be described below. The present invention also provides for the integration, into a single database, of preexisting source files developed under various types of application programs such as other databases, spreadsheets and word processing programs. In addition, the present invention allows users to control all of the data that are relevant to them without sacrificing the security needs of a centralized data repository.

SUMMARY OF THE INVENTION

The distributed storage system of the present invention provides a method and apparatus for storing, retrieving, and sharing data items across multiple physical storage devices that may not always be connected with one another.

The distributed storage system of the present invention comprises one or more 'partitions' on distinct storage devices, with each partition comprising a group of associated data files which in turn contain a collection of data items, each of which can be accessed individually. Partitions can be of various types. Journal partitions may be written to by a user and contain the user's updates to shared data items. In the preferred embodiment, journal partitions reside on a storage device associated with a client computer in a client-server architecture. Other types of partitions, library and archive partitions, may reside on storage devices associated with a server computer in a client-server architecture.

The data items on the journal partitions of the various clients may, at various times, be merged into a data item resident within a new, consolidated partition. If two or more clients attempt to update or alter data related to the same data item, the system resolves the conflict between the clients to determine which updates, if any, should be stored in the consolidated partition. The merge operation may occur at various time intervals or be event driven. At other various times, the consolidated partition can optionally be merged into the library partition, which maintains a shared version of a data item. The archive partition stores older versions of data items from the library partition.

Multiple journal partitions can share the same library and archive partitions, which provides a means for providing the data items in the library and archive partitions as shared, while allowing the data items in the journal partition to have a local version, independent of data items in other journals or shared data items.

In the preferred embodiment, the journal partition of the present invention comprises a series of objects that are written sequentially to physical memory. The journal partition stores older versions of objects such that a user may retrieve data that had been changed. The objects correspond to data items, such as a record in a database or a text file. A table is stored to track the location of objects within the journal partition.

The present invention improves upon prior art information search and retrieval systems by employing a flexible, self-referential table to store data. The table of the present invention may store any type of data, both structured and unstructured, and provides an interface to other application programs such as word processors that allows for integration of all the data for such application programs into a single database. The present invention also supports a variety of other features including hypertext.

The table of the present invention comprises a plurality of rows and columns. Each row has an object identification number (OID) and each column also has an OID. A row corresponds to a record and a column corresponds to an attribute such that the intersection of a row and a column comprises a cell that may contain data for a particular record related to a particular attribute. A cell may also point to another record. To enhance searching and to provide for synchronization between columns, column definitions are entered as rows in the table and the record corresponding to a column contains various information about the column. This renders the table self referential and provides numerous advantages, as will be discussed in this Specification.

The present invention includes an index structure to allow for rapid searches. Text from each cell is stored in a key word index which itself is stored in the table. The text cells include pointers to the entries in the key word index and the key word index contains pointers to the cells. This two way association provides for extended queries. The invention further includes weights and filters for such extended queries.

The present invention includes a thesaurus and knowledge base that enhances indexed searches. The thesaurus is stored in the table and allows a user to search for synonyms and concepts and also provides a weighting mechanism to rank the relevance of retrieved records.

An application support layer includes a word processor, a password system, hypertext and other functions. The novel word processor of the present invention is integrated with the table of the present invention to allow cells to be edited with the word processor. In addition, the table may be interfaced with external documents which allows a user to retrieve data from external documents according to the enhanced retrieval system of the present invention.

These and other features and advantages of this invention will become further apparent from the detailed description and accompanying FIGS. that follow. In the FIGS. and description, numerals indicate the various features of the invention, like numerals referring to like features throughout both the drawings and the description.

BRIEF DESCRIPTION OF THE DRAWINGS

FIG. 15 illustrates the table structure of the database of the present invention.

FIG. 20 illustrates a "Record Contents" column of the present invention that indicates which columns of a particular record have values.

FIG. 21 illustrates a folder structure that organizes records. The folder structure is stored within the table of FIG. 15.

FIG. 27A illustrates an extended search in graphical form.

FIG. 28 illustrates the thesaurus structure of the present invention stored in the table of FIG. 15.

FIG. 29 illustrates prior art hypertext.

FIG. 30 illustrates the hypertext features of the present invention.

FIG. 33A illustrates the results of a prior art sorting algorithm.

FIG. 33B illustrates the results of a sorting algorithm according to the present invention.

FIG. 34 illustrates the correspondence between cells of the table of FIG. 15 and a sorted date index.

NOTATION AND NOMENCLATURE

Figure 1:
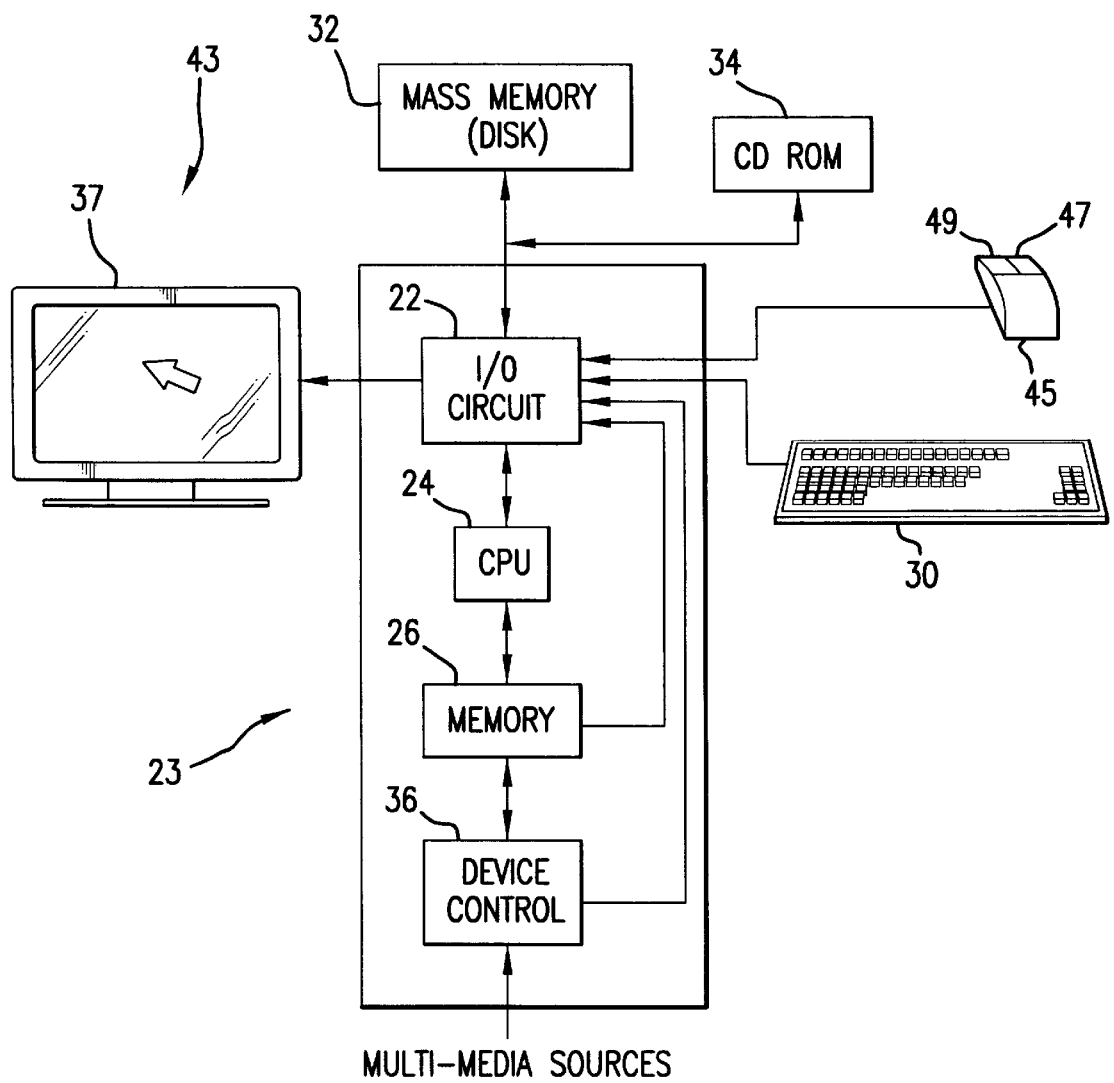
FIG. 1 is a functional block diagram illustrating one possible computer system incorporating the teachings of the present invention.

The detailed descriptions which follow are presented largely in terms of algorithms and symbolic representations of operations on data bits within a computer memory. These descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar digital devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

A data item as referred to herein corresponds to a discrete element of data that a user may wish to access. For example, a data item may comprise a particular record of a database or a particular field within a record of a database. A data item may comprise a word processing file or any other type of file. A data object as referred to herein stores a version of a data item. Different versions of the same data item may be stored in different data objects. For example, an original version of a text file and an updated version will be stored in two different data objects that each correspond to the same data item, the actual text file.

A domain describes the type of a particular data item and is used consistently with the terminology in the copending Application entitled "Method and Apparatus for Improved Information Storage and Retrieval System" filed Feb. 3, 1995, Ser. No. 08/383,752. Thus, for example, a particular data item may be of the text, number or Boolean domains, or a user defined domain.

DETAILED DESCRIPTION OF THE INVENTION

The present invention discloses methods and apparatus for data storage, manipulation and retrieval. Although the present invention is described with reference to specific block diagrams, and table entries, etc., it will be appreciated by one of ordinary skill in the art that such details are disclosed simply to provide a more thorough understanding of the present invention. It will therefore be apparent to one skilled in the art that the present invention may be practiced without these specific details.

Moreover, certain terms such as "knows", "verifies", "stores", "finds", "replaces", "examines", "determines", etc. may be used in this Specification and are considered to be terms of art. The use of these terms, which to a casual reader may be considered personifications of computer or electronic systems, refers to the functions of the system as having human like attributes, for simplicity. For example, a reference herein to an electronic system or computer program "determining" something is simply a shorthand method of describing that the electronic system has been programmed or otherwise modified in accordance with the teachings herein. The reader is cautioned not to confuse the functions described with every day human attributes. These functions are machine functions in every sense.

Local System Hardware

Referring to FIG. 1, the hardware configuration of the present invention is conceptually illustrated. FIG. 1 illustrates an information storage and retrieval system structured in accordance with the teachings of the present invention. As illustrated, the information storage and retrieval system includes a computer 23 which comprises four major components. The first of these is an input/output (I/O) circuit 22, which is used to communicate information in appropriately structured form to and from other portions of the computer 23. In addition, computer 20 includes a central processing unit (CPU) 24 coupled to the I/O circuit 22 and to a memory 26. These elements are those typically found in most computers and, in fact, computer 23 is intended to be representative of a broad category of data processing devices.

Also shown in FIG. 1 is a keyboard 30 for inputting data and commands into computer 23 through the I/O circuit 22, as is well known. Similarly, a CD ROM 34 is coupled to the I/O circuit 22 for providing additional programming capacity to the system illustrated in FIG. 1. It will be appreciated that additional devices may be coupled to the computer 20 for storing data, such as magnetic tape drives, buffer memory devices, and the like. A device control 36 is coupled to both the memory 26 and the I/O circuit 22, to permit the computer 23 to communicate with multi-media system resources. The device control 36 controls operation of the multi-media resources to interface the multi-media resources to the computer 23.

A display monitor 43 is coupled to the computer 20 through the I/O circuit 22. A cursor control device 45 includes switches 47 and 49 for signally the CPU 24 in accordance with the teachings of the present invention. A cursor control device 45 (commonly referred to a "mouse") permits a user to select various command modes, modify graphic data, and input other data utilizing switches 47 and 49. More particularly, the cursor control device 45 permits a user to selectively position a cursor 39 at any desired location on a display screen 37 of the display 43. It will be appreciated that the cursor control device 45 and the keyboard 30 are examples of a variety of input devices which may be utilized in accordance with the teachings of the present invention. Other input devices, including for example, trackballs, touch screens, data gloves or other virtual reality devices may also be used in conjunction with the invention as disclosed herein.

System Structure

The present invention comprises two main components. The first component is a distributed file architecture that permits two or more users to access a common file. The second component is the physical storage system within the local computer 23 that supports variable length data items and maintains previous versions of the data items. The Specification will discuss these components in turn.

Distributed Architecture

Figure 2:
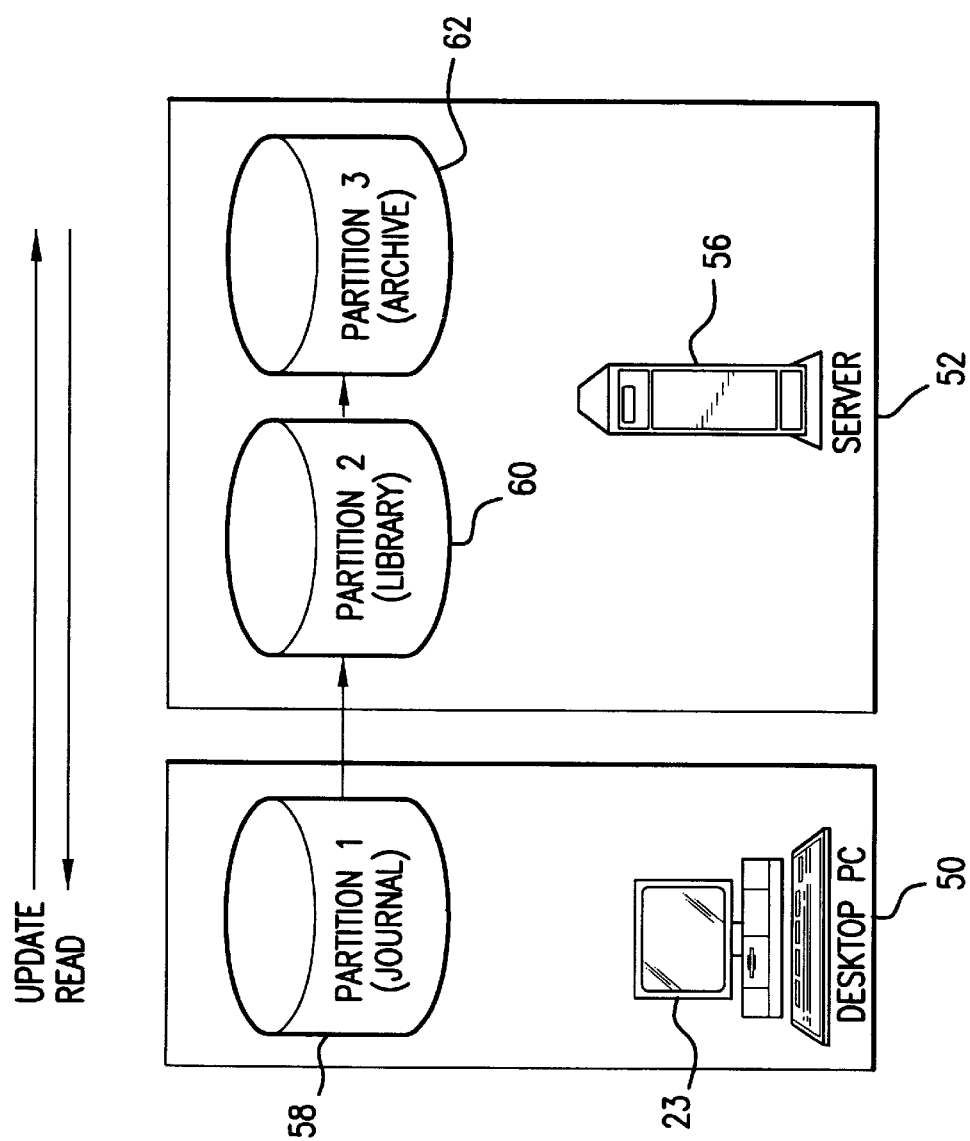
FIG. 2 is a block diagram illustrating the partition structure of the present invention in a client-server architecture.

FIG. 2 illustrates an overview of the physical storage architecture of the present invention. As shown, the computer 23, commonly known as a client, communicates with a remote computer 56, commonly known as a server, that contains database files and other files that the computers 23 and other computers may access.

NOTE: The transmission of data items between physical locations can occur over any network communication system, including, but not limited to: TCP/IP, Novell IPX, and NetBEUI. The packaging protocol used to transmit data items may be any standard scheme for transmitting data, including, but not limited to: File transfer protocols such as FTP, Modem transfer protocols such as ZMODEM, Email protocols such as SMTP, Hypertext Transport Protocol, and so on.

Design of the Physical Storage System

Difficulties arise where two users simultaneously attempt to update the same file that resides on the server 56.

To avoid the difficulties typically associated with simultaneous access, the present invention divides the physical storage system into partitions where each physical device contains at least one partition. Each partition comprises one or more associated data files. As illustrated in FIG. 2, the client computer 23 includes a journal partition 58 stored on the disk 32 while the server 56 includes a library partition 60 and an archive partition 62 that reside on the same or different storage devices within the server 56.

As will be readily appreciated, FIG. 2 illustrates one type of architecture structured according to the teachings of the present invention. For example, other possible combinations may include, but are not limited to, the following: a) the library partition 60 may reside on a CD-ROM and the journal partition on a client computer 23. b) all three partitions may reside on the client computer 23, c) the journal partition is on a network server, one library partition is one the same server, and a second library partition is connected remotely over the Internet.

A particular list of linked partitions is called a 'partition chain', as illustrated by partitions 58, 60 and 62 in FIG. 2. A partition chain may contain any number of partitions, including one. In the preferred embodiment, the partition 58 nearest the user is called the 'update partition' and must be a journal partition and is the only partition in the chain that can be updated directly. The other partitions, 60 and 62, are 'remote partitions' and are read-only partitions such that they can be read from but not written to directly.

Partitions may be classified according to various types, depending upon the function of the partition. A journal partition such as the partition 58 comprises at least one append-only journal file as will be described more fully below. A library partition, such as the partition 60, stores a 'packed' version of the journal partition, containing only a single version of each data item. An archive partition, such as the partition 62, stores multiple historical versions of the data. Other types of partitions are possible. Generally, journal, library and archive partitions are linked together as illustrated in FIG. 2.

Updates to files, such as database and word processing files, are not written directly to the library partition 60. Instead, updates are stored in the journal partition 58 immediately and then provided to the server 56 and merged into the library partition 60 at some later time.

Figure 3:
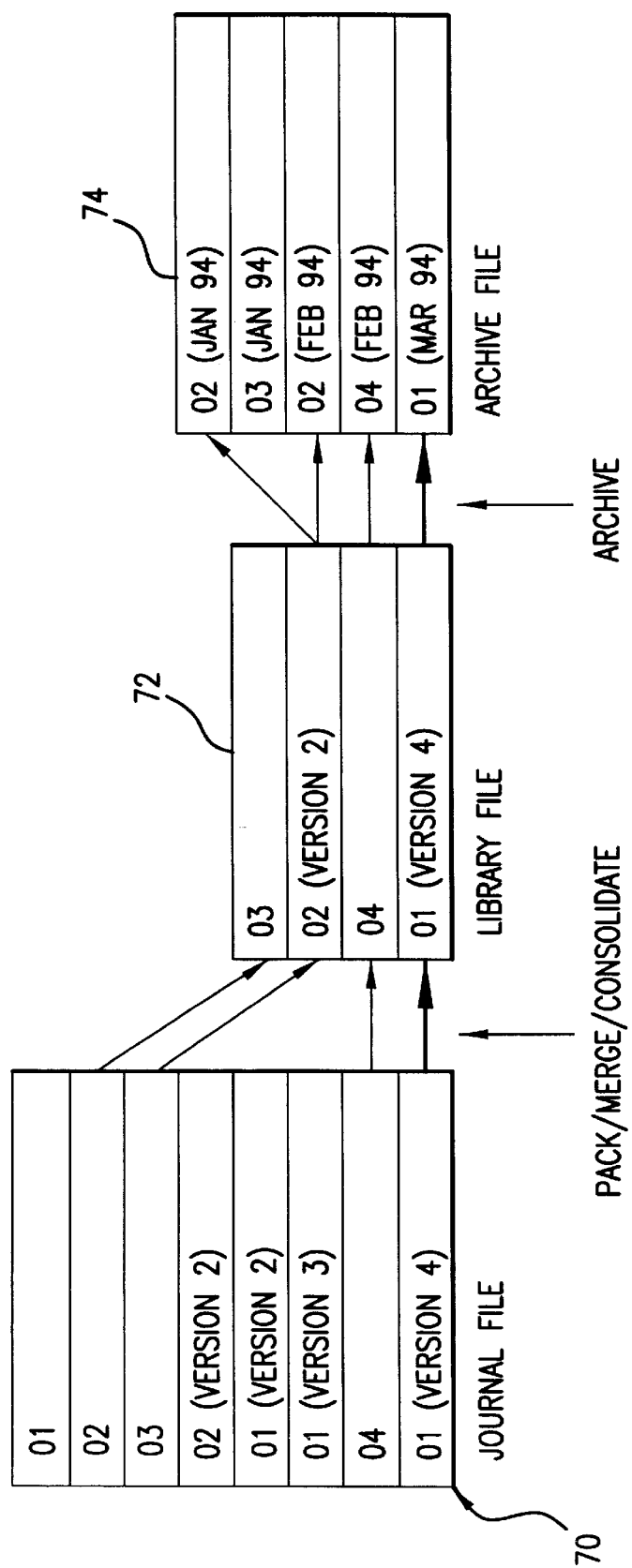
FIG. 3 illustrates the linkage between the partitions of FIG. 2 and shows how files are transferred from one partition to another.

FIG. 3 illustrates the linkage between the journal partition 58, the library partition 60 and the archive partition 62. A journal file 70 residing within the journal partition 58 includes various data objects, for example database records, and the file may also contain unused memory. At a later time, the journal file 70 is packed and consolidated into a new consolidation file 70 which can be inserted in the partition chain between the now empty journal files, and the library file The consolidated journal file may be optionally packed and then stored in a library file 72 stored within the library partition 60. In turn, the server 52 may write the library file 72 to an archive file 74, stored within the archive partition 62. The archive file 74 contains multiple versions of the same data object.

Appendable Data Items

In many applications, the library may contain a large data item such as an item which stores a list of 10,000 pointers to objects or a large text document. In these cases, updating the value of the data item would cause an unnecessary duplication of the data.

The physical storage system of the present inventions supports 'appendable' data items, which distribute the storage of their contents across multiple partitions. An appendable data item keeps track of the changes to the original data and stores only the changes to the original data in the journal.

Figure 4A:
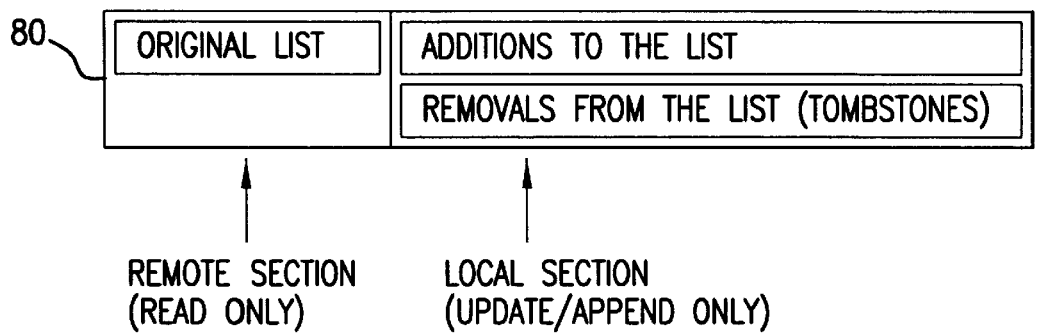
FIG. 4a illustrates the structure of an appendable list data item that may exist within more than one partition.
Figure 4B:
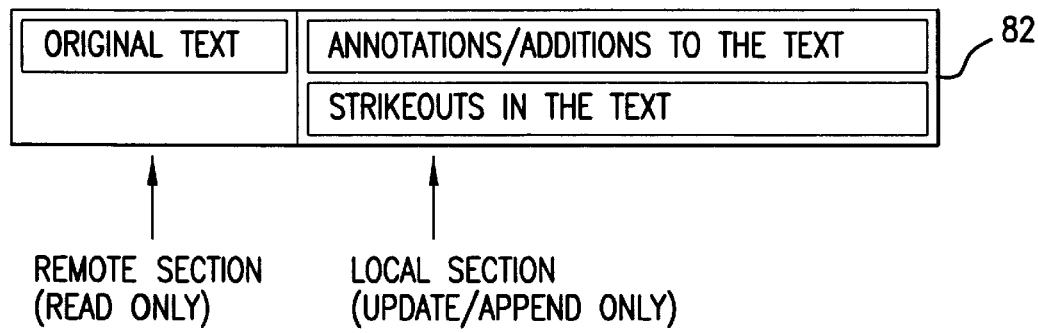
FIG. 4b illustrates the structure of an appendable text data item that may exist within more than one partition.

The internal structure of an appendable data item comprises two parts, a 'remote' section, where the original data is stored, and a 'local' section, where the changes are kept. FIGS. 4a and 4b show two implementations of appendable items for a list and text data, respectively. FIG. 4a illustrates a list data item, which comprises an original list stored a remote partition and additions and removals from the list stored in a local partition. The original list is a read only list and any updates must be written to the update list. Changes might be stored as identification numbers to add to the original list, and identification numbers to remove from the original list.

Similarly, FIG. 4b illustrates a text data item stored as an appendable list 82, which comprises original text stored in a remote partition and additions and deletions from the text stored in a local partition. The original text is stored such that it is read only text and any updates must be written to the local partition. The changes might be stored as a series of editing actions such as insertions, deletions, and formatting actions.

The use of appendable data items is advantageous. They allow the storage requirements for updates to be minimized since the original information need not be stored in the local partition. Further, they reduce synchronization problems since the local partition stores only the changes to the original data and not the original data itself. Finally, the use of appendable data items allows read-only media such as CD-ROMs and one-way electronic publishing services to be annotated.

Shared Vs Private Data Items

Multiple partition chains can share some or all of the same library and archive partitions, which provides a means for providing the data items in the library and archive partitions as shared, while allowing the data items in the journal partition to have a local version, independent of data items in other journals or shared data items.

During consolidation, the various journal files can be consolidated to various degrees, by excluding certain data items from consolidation. Furthermore, the consolidation file itself can act as a new partition without being merged into the prior library partition.

In this way, 'layers' of data items can be constructed, with each layer masking out portions of the previous layer.

For example, consider the following situation: the partition chain for user X contains a data item A1 in its journal file; the partition chain for user Y contains a data item B1 in its journal file, and both chains contain a library partition C which has a data item C1, and an older version of data item A1, called A2.

In this situation, user X will see data items A1 and C1, but B1 will be hidden from him. User Y will see data items B1 and C1, and will see the older version A2 of A1, which resides on partition C.

Using the storage system to provide layers in this way, users of the storage system can maintain personal versions of certain data items, while still having the benefits of sharing other data items. Furthermore, the various layers can serve various purposes, for example, there could be a four layer system, with the layers defined as follows: the first layer can be personalized for a single user, the next layer can contain shared information for a workgroup, the succeeding layer can contain shared information for a company-wide information system, and the final layer can contain publicly shared information.

Inserting New Layers

The current invention provides for the advantageous ability for users to exchange subsets of their data items with each other by using the layer method.

A user X can create a new partition (A, say) based on a subset of his data, and transmit it to another user Y, using any standard data transfer system as described above. User Y can then insert the partition A into his partition chain with the result that all of the data items in Partition A immediately and transparently appear to be part of user Y's data set, unless a particular data item was masked by a 'higher' layer.

This ability can be advantageously applied to such requirements as: synchronizing users who are not sharing a centralized system, shipping updates and annotations to a read-only published medium such as a CD-ROM, and gathering and consolidating information from distinct sources.

Merging

As previously described, the system provides the consolidated contents of the journal partition 58 to the library partition 60 according to clock intervals or the occurrence of events. The user of the system may define those conditions that trigger such a merge operation such as when the journal partition 58 contains a specified amount of data or when a certain amount of transactions have occurred since the most recent merge operation.

Figure 6:
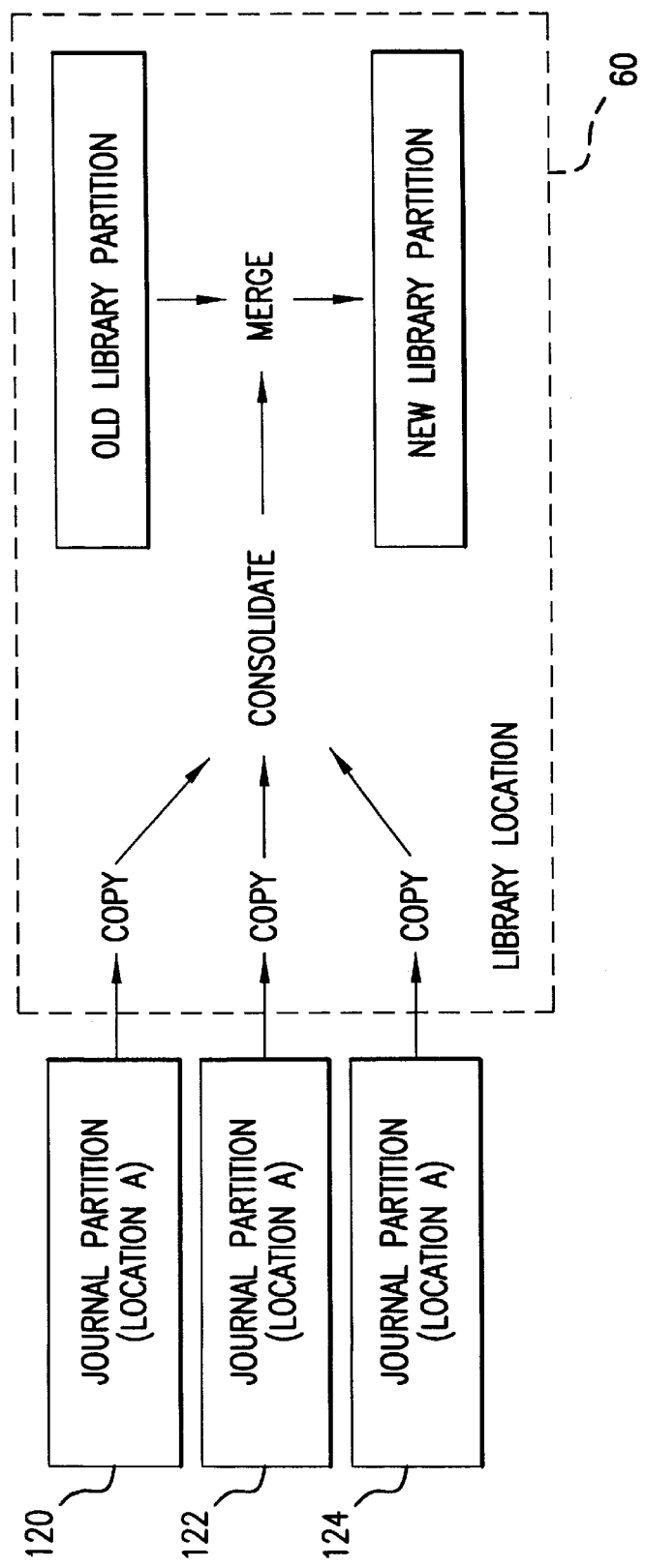
FIG. 6 is an illustration of an operation for merging files located in a journal portion to a file located in a library partition.

When the updates are merged into the library partition 60, older versions from the library partition 60 are relocated to the archive partition 62. FIG. 6 illustrates a merge operation, where a plurality of data items 120, 122 and 124 in different locations within the journal partition 58 are copied and the copies provided to the library partition 60 where they are consolidated and merged with the other data in the library partition 60. To decrease transmission time from the journal partition 58 to the library partition 60, the data items may be compressed according to a data compression algorithm.

Figure 7:
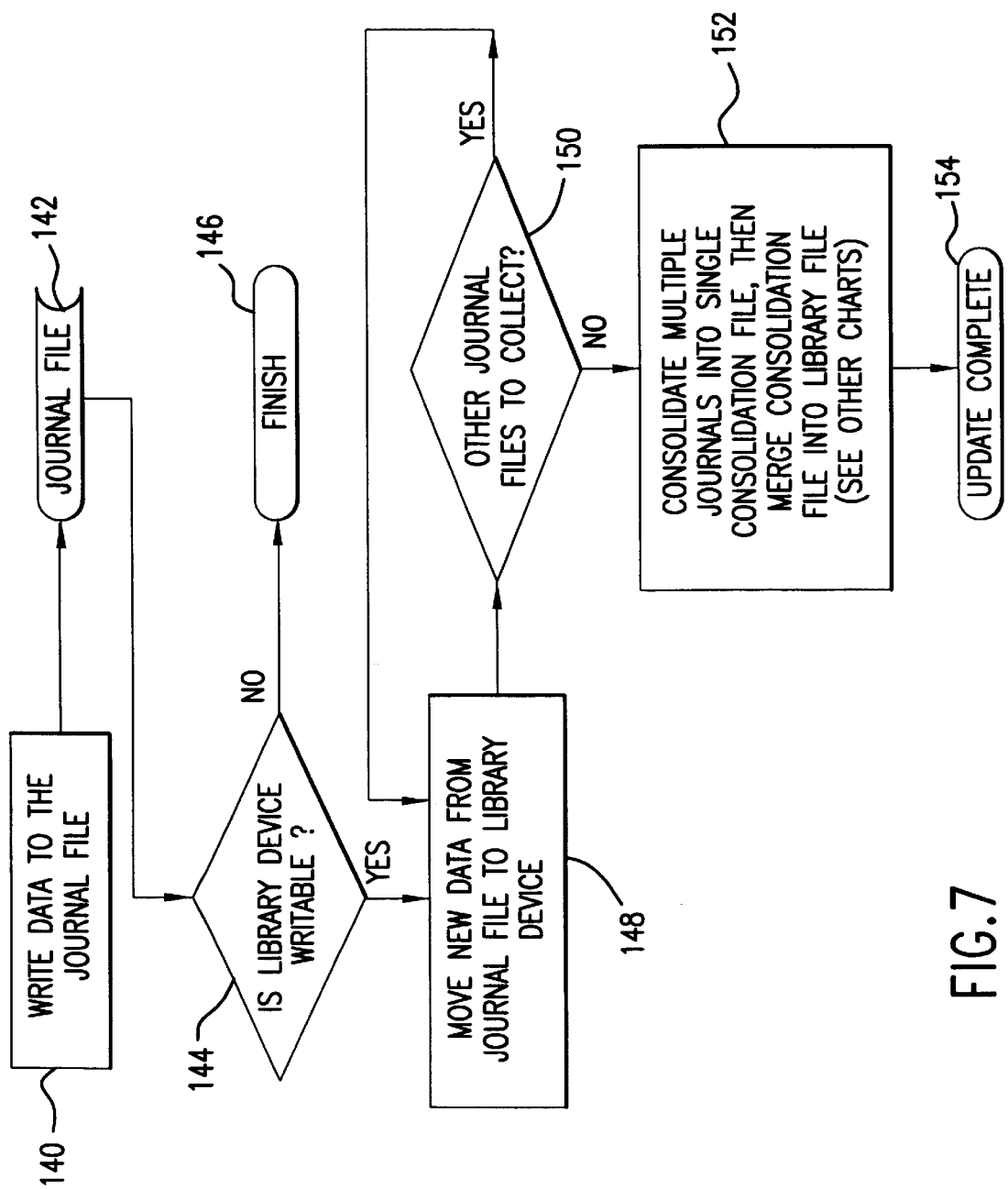
FIG. 7 is a flow chart illustrating the sequence of steps of the present invention for writing data to a consolidation file.

FIG. 7 is a flow chart for a merge operation. At blocks 140 and 142, data is written to a file in the journal partition 58. At block 144, the system determines whether the device on which the library partition 60 resides may be written to. If the device is a read-only device such as a CD-ROM, then the merge process cannot occur, and the routine halts at block 146. Otherwise, the system branches to block 148 where data is provided to the library partition 60 from the journal partition 58. At block 150, the system determines whether other journal files need to be merged. If so, the system branches back to block 148. Otherwise, the system consolidates multiple data items from the journal partition 60 into a single consolidation file and the file is merged into the library file, as illustrated in block 152. Subsequently, the routine exits, as illustrated in block 154.

When two or more users attempt to modify the same file, a conflict will emerge during a merge operation. The system must decide whether both updates may be permitted, and, if not, which of the two updates, if either, should be stored. The consolidation procedure as previously described must resolve these conflicts.

Figure 8:
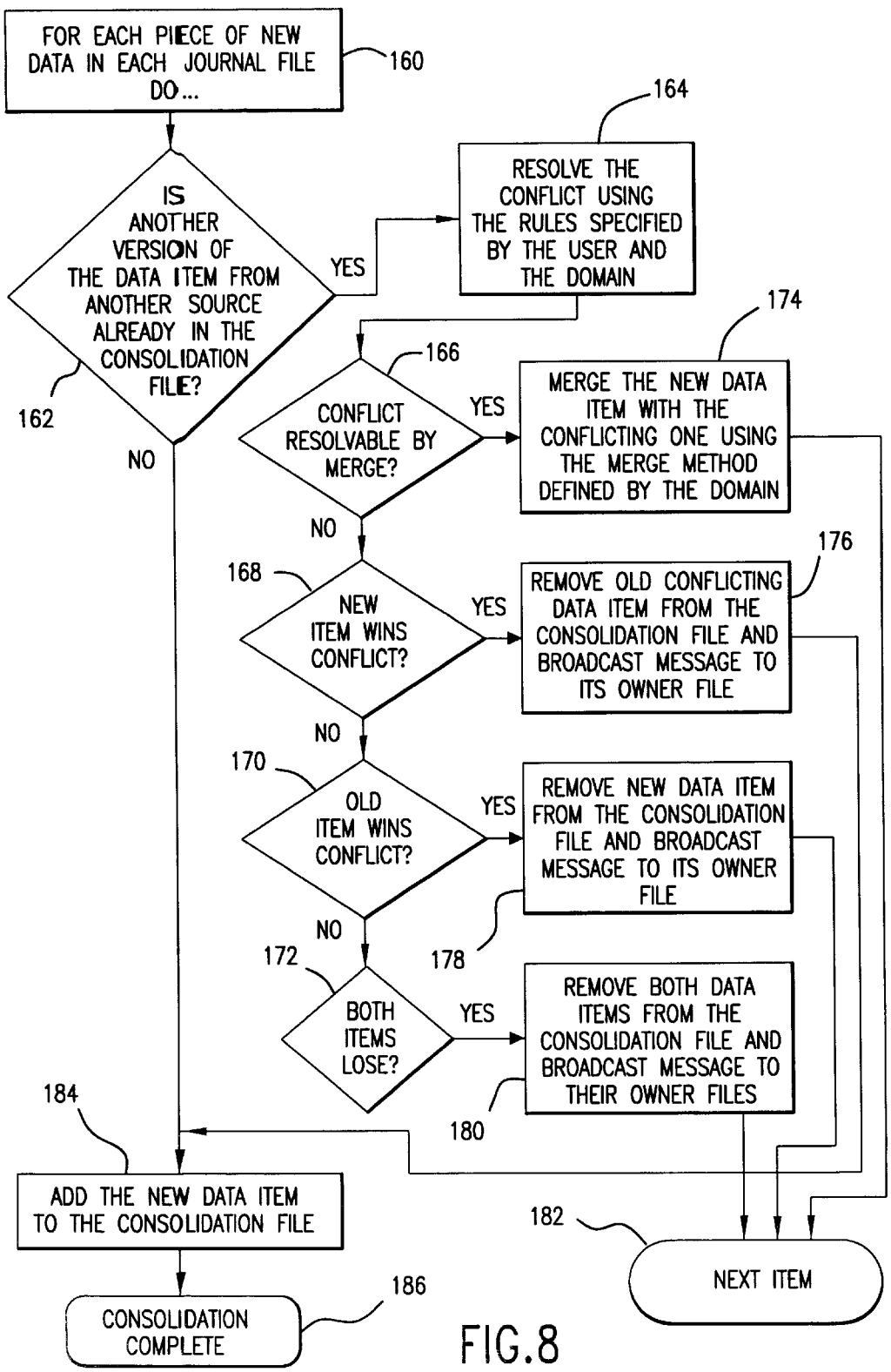
FIG. 8 is a flow chart illustrating the sequence of steps of the present invention for consolidating the consolidation file.

FIG. 8 is a flow chart for the consolidation procedure. At block 160, the routine initializes and a new 'consolidated' file is created which will eventually contain all the data from the journal files. For each journal file in turn, and each data item in each journal file, the routine attempts to add the data item to the consolidation file.

At block 162, the routine determines whether another version of the data item from another source, usually a device associated with a different user, already exists within a consolidation file. If not, the new data is added to the consolidation file at block 184 and the routine exits at block 186. If another version of the data item from another source already exists within the consolidation file, block 162 branches to block 164 and the conflict between the versions is resolved by applying the rules specified by the user or specified by the type of data object. In certain instances, the conflict may be resolved by a merge operation. For example, two changes to a text document that do not overlap can be merged. If the routine solved the conflict in block 164, block 166 branches to block 174 where the new data is merged with the data from another source using the method defined by the user or object type (domain). The system then retrieves the next item at block 182.

If the routine did not solve the conflict in block 164, block 166 branches to block 168 where the system determines whether the new item or the item from another source will be stored. If the new item wins the conflict and will thus be stored, block 168 branches to block 176 where the item from another source is removed from the consolidation file and a message provided to the user that created the item from another source to inform that user that the data item will not be stored. Subsequently, the routine branches to block 182. The winner of the conflict may be determined by a number of rules, including but not limited to, which item had the most recent timestamp or the higher value. Alternatively, the routine may give priority to the user with a higher status journal file or the user who entered the information.

If the new item does not win the conflict in block 168, block 168 branches to 170 where the system determines whether the item from another source wins the conflict. If so, block 170 branches to block 178 and the new data item is removed from the consolidation file and a message provided to the user that created the new data item and the routine branches to block 182. Finally, if neither the new item nor the item from another source wins the conflict, both data items are removed from the consolidation file and a message provided to the users of both items. Subsequently, the routine branches to block 182.

At this point, the old journal files can be cleared, ready to be updated again. If the library file must be left unchanged, the routine can halt and the consolidation file can be inserted in the partition chain as a new library partition, creating a new 'layer' as described above. Otherwise, the consolidation file can be, in turn, merged with the library file.

Figure 9:
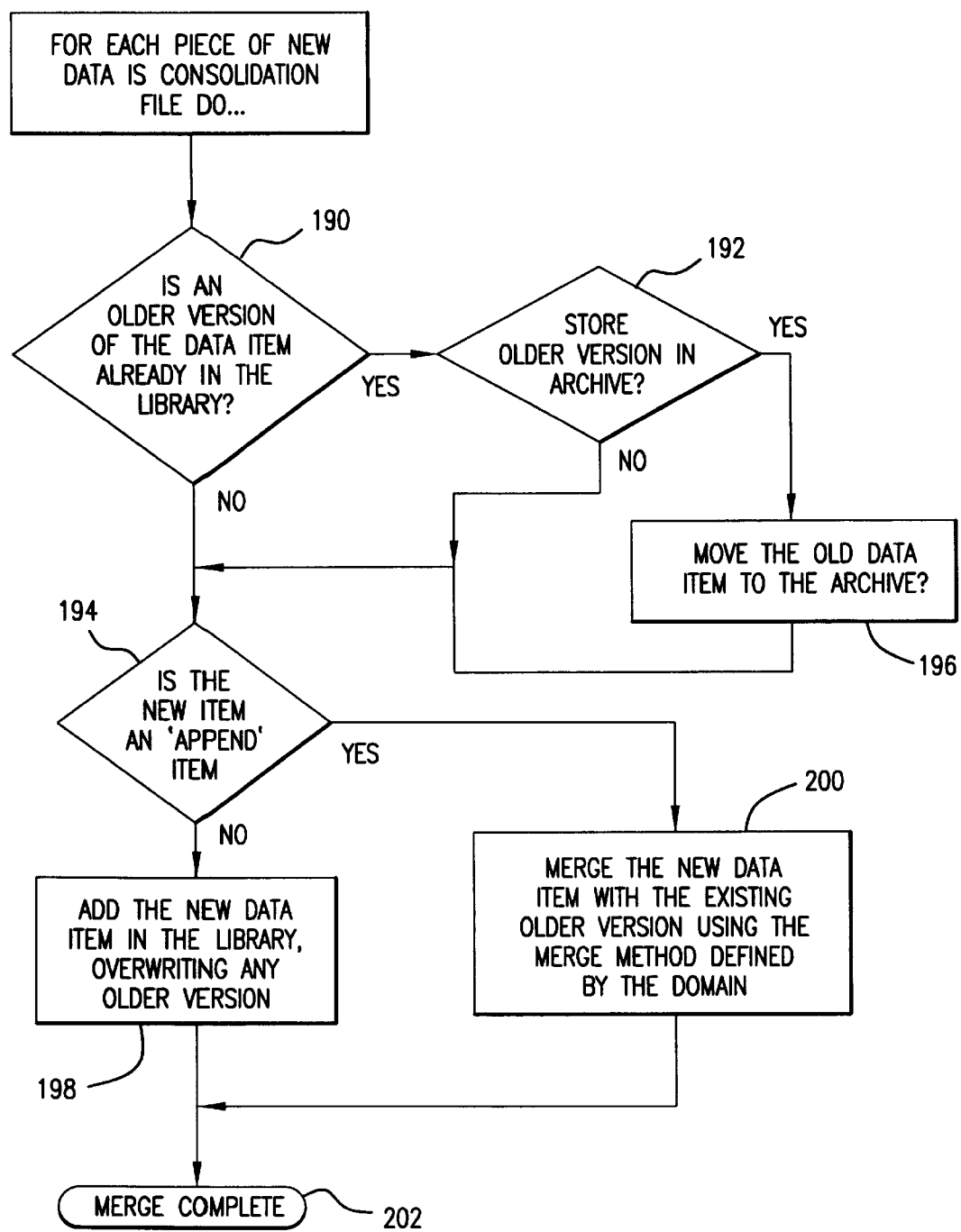
FIG. 9 is a flow chart illustrating the sequence of steps of the present invention for merging the consolidation file into a library file.

FIG. 9 is a flow chart for merging a consolidation file with a library file. At block 190, the routine determines whether an older version of the data item already exists in the library file, and, if not, the routine branches to block 194. Otherwise, block 192 determines whether the older version is to be preserved. If so, the older version is transferred to the archive file as illustrated in block 196. If the older version is not to be preserved, it is deleted, and block 192 branches to block 194.

At block 194, the system determines whether the new item comprises an appendable record that must be stored with its parent. If so, the new data item is merged with the existing older version using the merge method defined by the domain and the routine exits at block 202. According to the present invention, data may be merged from multiple sources, none of which need to be connected to the device upon which the library partition resides. If the new item is not an appendable record, block 194 branches to block 198 and the new data item is added to the library file, overwriting any older version. At block 198, as an option, the old version may be archived. Subsequently, the routine exits at block 202.

Reading and Writing Data Items

Since a appendable data item contains data residing within different partitions, reading and writing appendable data items requires that the system access the relevant partitions. When a user modifies an appendable data item through inputs from the keyboard 30 into the memory 26, the original contents are stored separately in the memory 26 from the changes and an 'append flag' is set for the item. When data items are written to permanent storage, such as the partition 58 within the memory 32, the system determines whether the 'append flag' is set, and, if so, only the changed part of the appendable item is written. The original data already resident on a different partition is not written since it can be reconstructed from the original read-only partition. However, to ensure the integrity of the system, a unique identification number representing the original data is also stored so that the system can detect if the original data is missing or changed.

Figure 5:
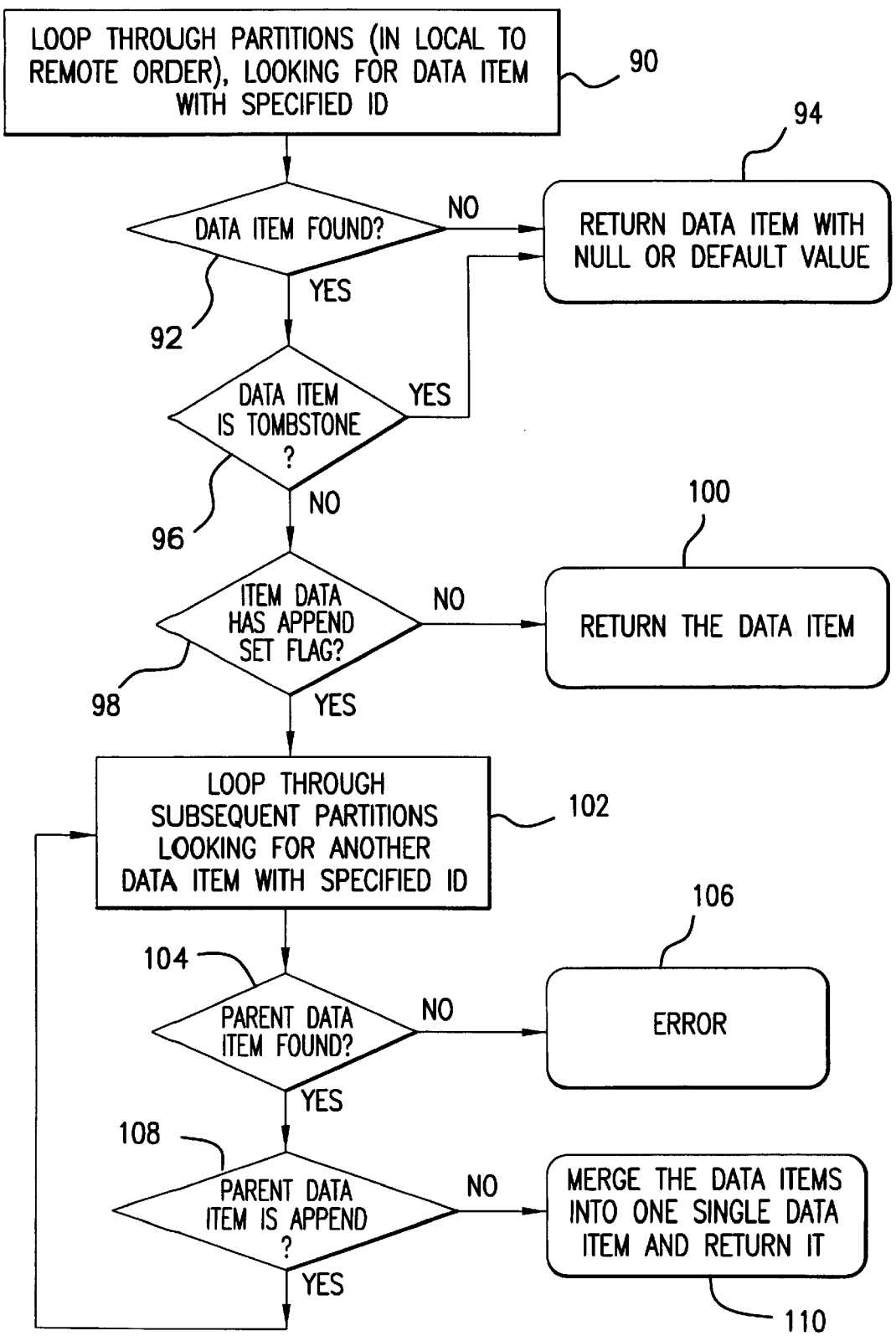
FIG. 5 is a flow chart for reading and writing data items according to the teachings of the present invention.

When reading a data item, the system determines whether the item's 'append' flag is set. If so, the system attempts to read the original data from a partition containing the original data, and merge the original data with the changes. FIG. 5 is a flow chart for reading data according to the teachings of the present invention. At block 90, the system first searches any local journal partitions and then searches remote partitions in order, such as the library partition and then the archive partition, to find a data item with the identification number of the data item being read. If the system cannot locate any data items, block 92 branches to block 94 and a "NULL" or default value is returned.

Conversely, if the system finds a data item, block 92 branches to block 96, and the system determines whether the data item is a "tombstone," that is, whether the particular data item has been deleted. If so, the system branches to block 94. Otherwise, at block 98 the system determines whether the append flag of the item is set and, if not, the system returns the data item as shown in block 100. If the append flag is set, indicating a appendable item, at block 102, the system searches other partitions to find other data items with the same identification number. If no parent data item is found, the system branches from block 104 to block 106 where the system indicates an error since an append flag implies that a parent data item exists.

If the system finds a parent data item, the system determines whether the parent data item's append flag is set at block 108, which indicates whether the parent has its own parent. If so, the routine branches back to block 102 where the next partition, in order, is searched. When the routine locates all related data items, they are merged into one item and returned, as illustrated in block 110.

Missing Partitions

One of the advantages of the current invention is that reading and writing of data items does not require all partitions to be present at all times. If data is mainly read from (and always written to) the journal partition, then some or any of the library and archive partitions can be absent without detrimental effect.

In particular, the current invention provides for processing data over an unreliable or completely disconnected partition chain.

For example, a user may have a journal partition and small, local library partition on a laptop computer. At certain times, the user can connect to a network to access a much larger master library partition and archive partition, but can also disconnect from the network and still be able to enter and retrieve data items successfully.

While the user is connected to the network, consolidation of the journal file may occur, if desired, after which a new journal and library file can replace the prior versions.

Furthermore, this same approach can be applied to other disconnectable partitions, including, but not limited to, partitions stored on: removable disks, CD-ROMs, Internet servers, and so on.

Journal File

This section describes the preferred embodiment of the journal partition 58. The journal partition 58 can store variable length data items, such as a free text database record, on a storage medium such that prior versions of these same items can be retained.

Figure 10:
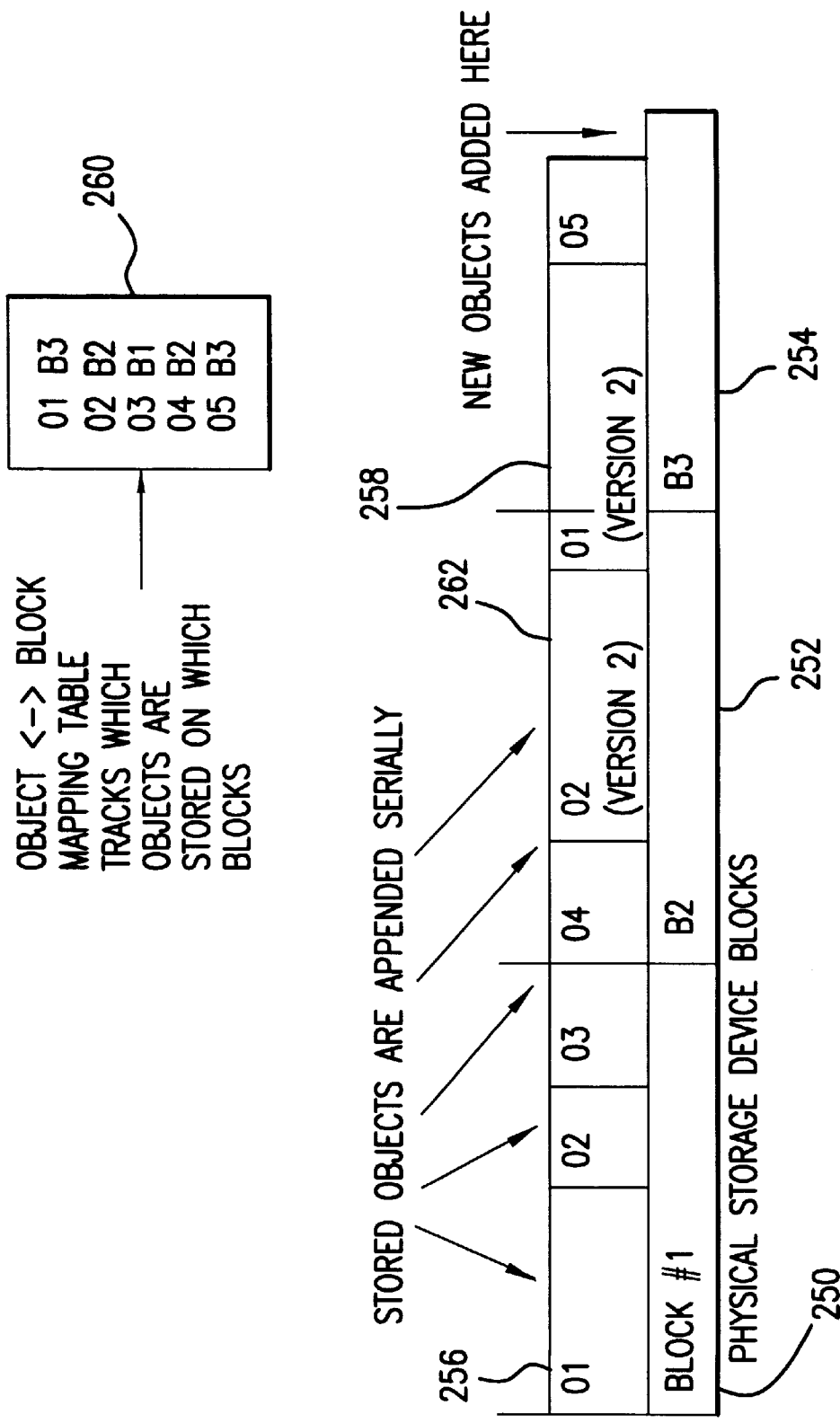
FIG. 10 illustrates the structure of a journal partition file in the preferred embodiment.

FIG. 10 illustrates the structure of the journal partition 58. The journal partition may reside on the mass memory 32 of FIG. 1. As illustrated in FIG. 10, the memory that includes the journal partition 58 is divided into physical storage device blocks 250, 252 and 254. Data objects, including data objects 256, 258 and 262, are stored within the blocks 250, 252 and 254.

As illustrated in FIG. 10, data objects to be stored in the journal partition 58 are appended serially to the memory and the blocks 250, 252 and 254 are not overwritten. Thus, the journal partition 58 may include older versions of the same data object. For example, a data object 256 may comprise a database cell including information about a company's employees and data object 258 may represent that cell after a user has updated it. The system creates a new block when needed and the system stores a table 260 that relates objects to their respective blocks. The table 260 is updated each time an object is written to a block.

Figure 11:
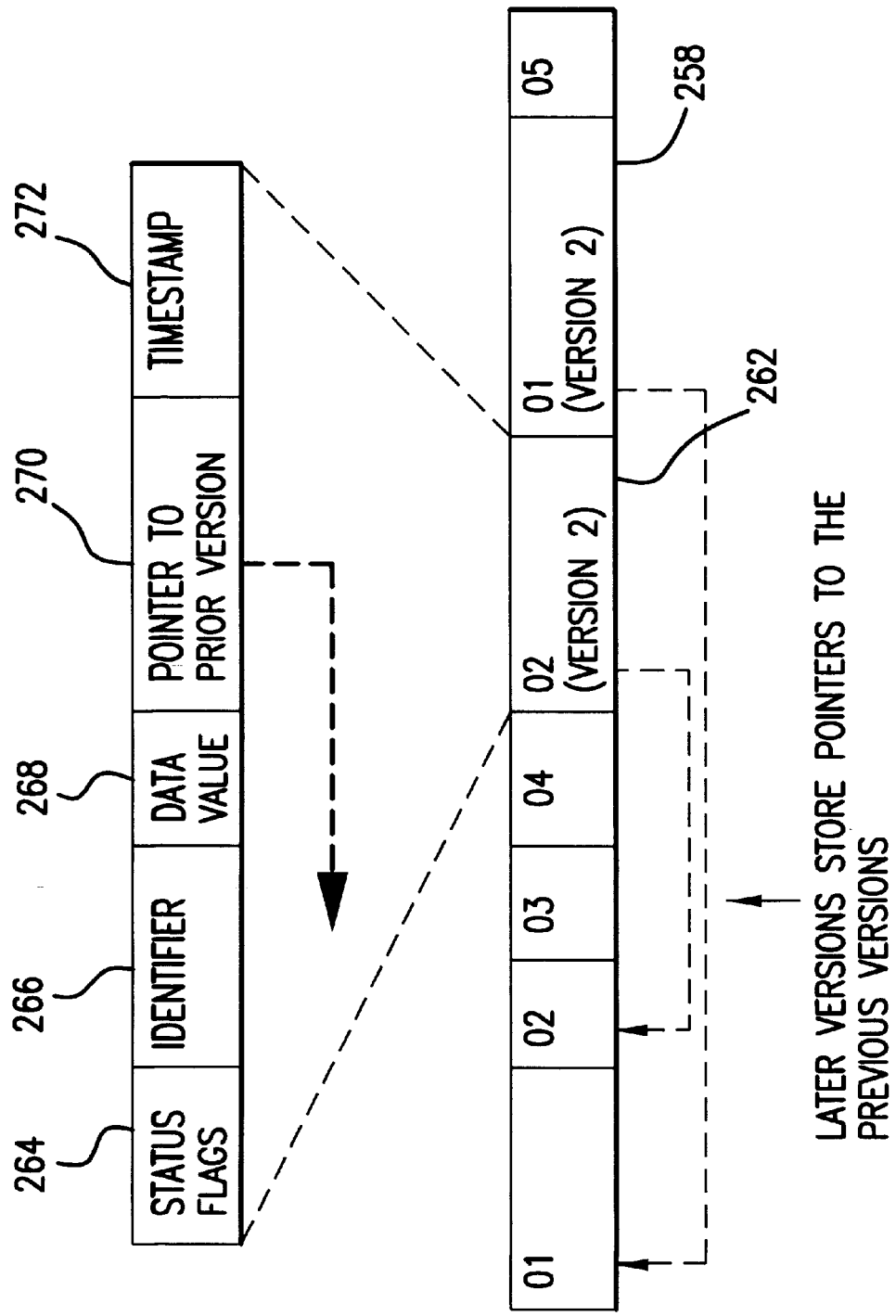
FIG. 11 illustrates the structure of an object stored in the journal partition.

FIG. 11 shows the contents of the object 262. In the preferred embodiment, the object 262 comprises five fields, a status field 264, an identifier field 266, a data field 268, a pointer field 268 and a timestamp field 272. Apart from the status field 264, the object 262 need not contain all of the other fields and the status field 264 contains flags that indicate those fields that an object contains. The data field 268 stores data such as text and numbers corresponding to the object 262 and the pointer field 268 contains a pointer to a prior version of the object 262. The timestamp field 272 indicates when the object 262 was created and the identifier field 266 contains a number identifying the object 262 that is used in the table 260.

Because prior versions of the data item cannot be removed, deleting a data item must be handled specially. To delete a data item, a special marker called a 'tombstone' is written to the journal partition to signify that the data item was deleted. The tombstone comprises an object with a data field that has no value and a special status flag is set to show that the item is a tombstone. The tombstone object stores a pointer to an object that contains the last version of the data item to be deleted.

To read a data item, the most recent version of the data item is retrieved by looking up the appropriate block in the table 260. Once the most recent version of a data item has been retrieved by retrieving the item's associated most recent object, prior versions can be retrieved by using the pointer stored within the retrieved object.

Eventually, a user may wish to discard older versions of the data items. This is done by copying the desired data items, generally the most recent, to another file, and discarding the original file.

Figure 12:
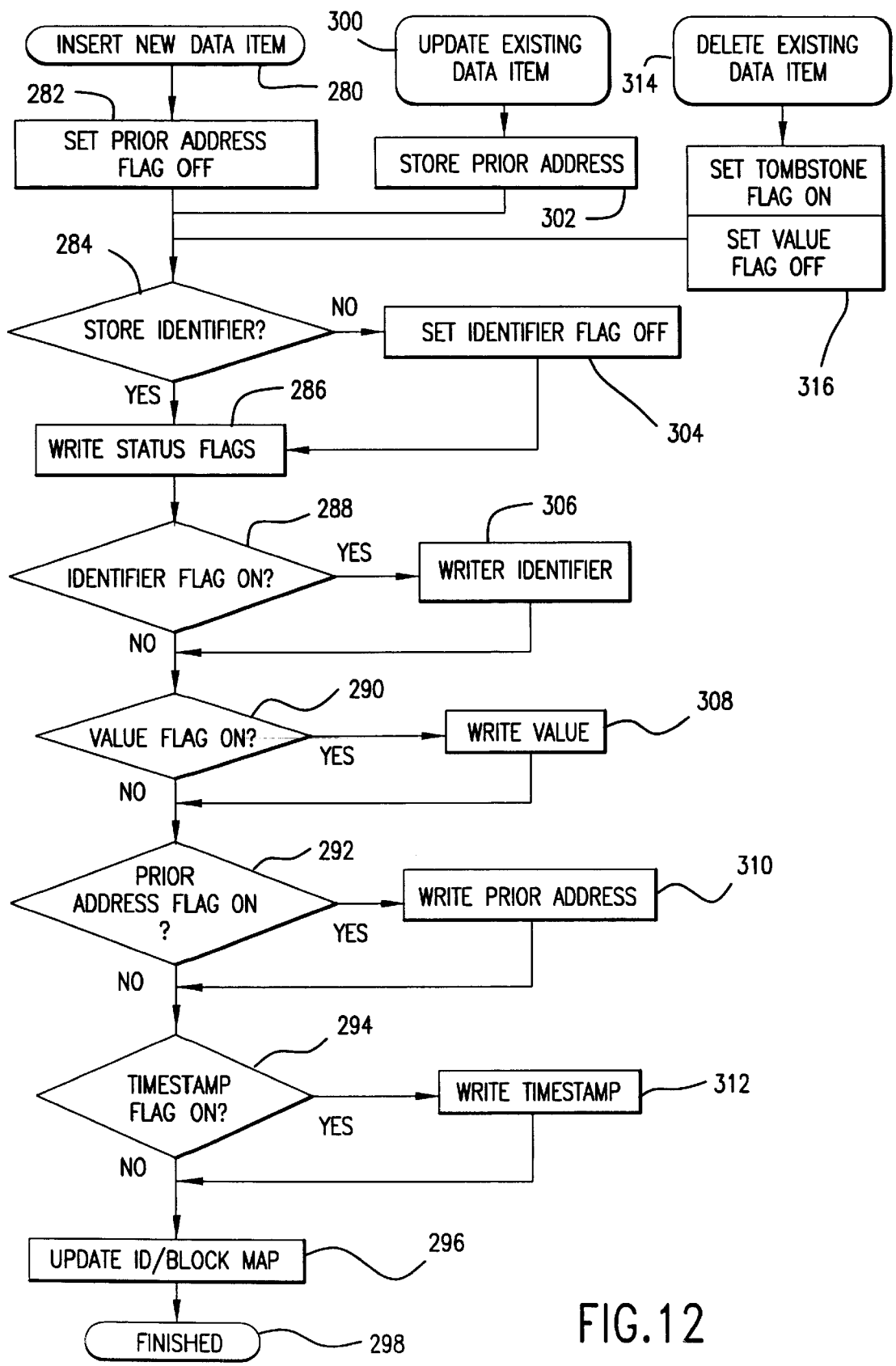
FIG. 12 is a flow chart for inserting, updating, and deleting data items from the journal file.

FIG. 12 is a flow chart for inserting items to the journal partition 58, updating items within the journal partition 58 and deleting data items from the journal partition 58. According to the routine illustrated in FIG. 12, inserting, updating and deleting are performed by a similar method and status flags indicate the difference between the actions.

All three operations include writing a new object to the journal partition 58. In the case of updating an existing data item, the new object includes the updated data and points to the previous version, as previously described. In the case of deleting a data item, a tombstone object is written to the journal partition 58 indicating the deleted data item, as previously described.

At block 280, an insert operation begins and branches to block 282, where the prior address flag is set to FALSE since the insertion of an item implies that there is no prior address to point to. Conversely, when updating an existing data item as indicated in block 300, the system stores the address of the object containing the item to be updated and sets its prior address flag to TRUE as shown in block 302. To delete a data item, as illustrated in block 314, the routine sets the "tombstone" flag to TRUE and the "data value" flag to FALSE, indicating that there is no data in the object being written, and that the object being written implies the deletion of a data item, as shown in block 316.

The system then writes the new object to the journal partition 58. Before writing, the routine may process the new object according to various options. For example, at block 284, the routine determines whether it will store an object identifier in the object identifier field. Storing the identifier is not necessary for retrieval, but can be used to recover data in case of file corruption. If the identifier is not to be stored, block 284 branches to block 304 and the identifier flag is set OFF. Block 304 branches to block 286 where the status flags are written to the journal partition 58.

At block 288, the routine determines whether the identifier flag is TRUE. If so, the system branches to block 306 and the identifier is written to the journal partition 58. The system then branches to block 290, to determine whether the value flag is TRUE. If so, the system writes the data value to the journal partition 58. Similarly, at block 292, the routine determines whether the prior address flag is TRUE. If so, the system branches to block 310 and the prior address is written to the pointer field in the new data object created in the journal partition 58. The system then branches to block 294, to determine whether the timestamp flag is TRUE. If so, the system writes the timestamp to the timestamp field of the new object created in the journal partition 58.

Finally, the table 260 is updated to reflect the new location of the data item on disk corresponding to the new object written to the journal partition 58.

This approach allows for various options. For example, for all items, it is optional to store the identifier. If the identifier, timestamp, and prior pointer are not stored, the required storage size of the data item is minimal.

Data Recovery

In the preferred embodiment, the structure of the table 260 is a standard extendible hash table data structure. As previously described, the table 262 is updated every time a new object is written to the journal partition 58. Since the table 260 may become quite large, to avoid saving it, by writing it to a non-volatile memory, every time it is updated, a checkpoint approach is used whereby the table 260 is saved at certain user-defined intervals. For example, a user may specify that the table should be saved after every 50 updates.

Figure 13:
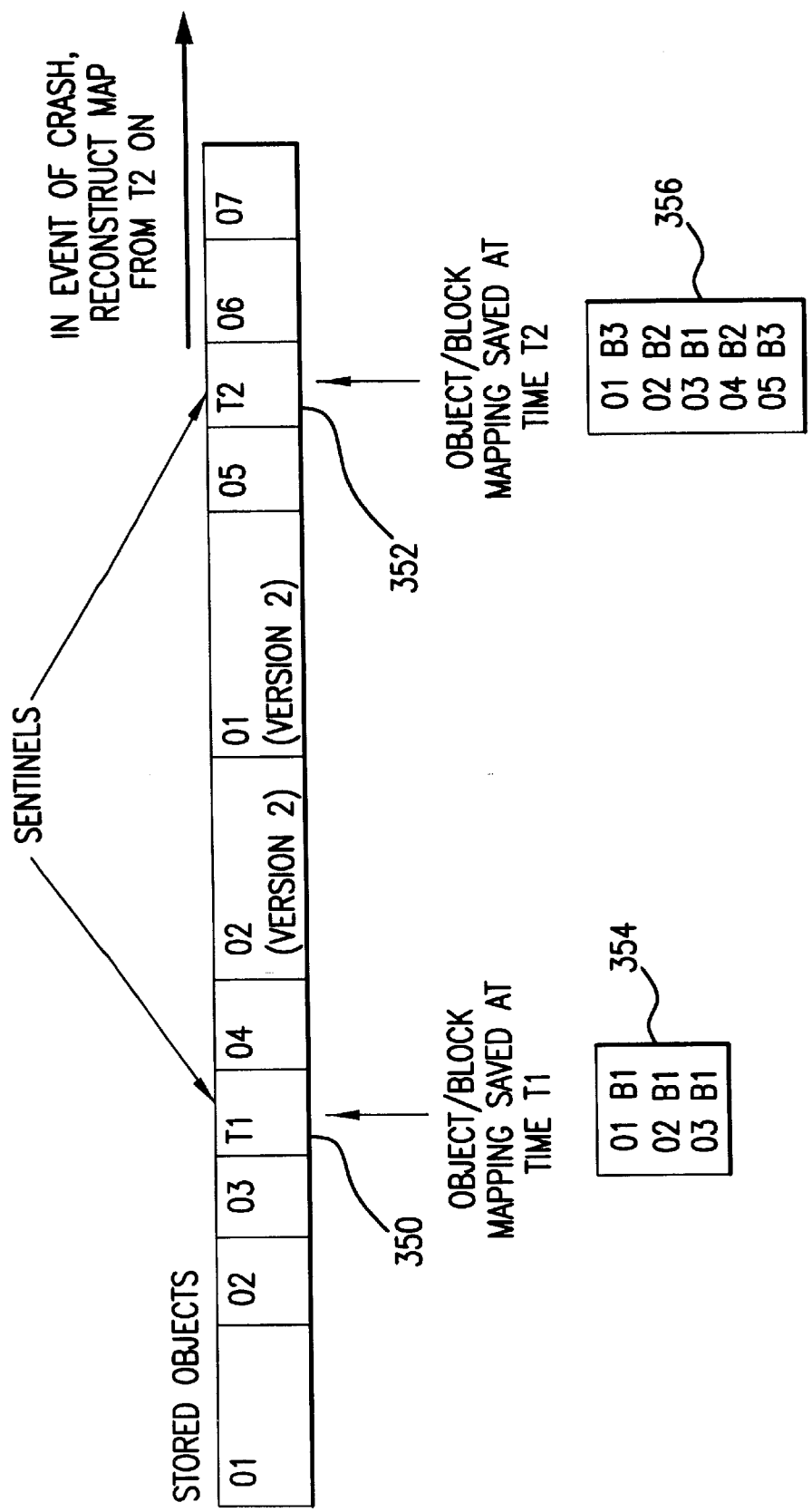
FIG. 13 illustrates the "sentinel" feature of the present invention for storing tables that map objects stored in the journal file to blocks of physical memory.

After the table 262 is saved, a "sentinel" is written to the journal partition 58. FIG. 13 illustrates "sentinel" data object. "Sentinel" objects 350 and 352 each contain a timestamp and pointers to tables 354 and table 356 respectively. The tables 354 and 356 comprise versions of the table 260 and are stored in non-volatile memory when the "sentinel" objects are written to the journal partition 58.

If a crash occurs, the system need only reconstructed the table 260 since the actual data is already stored on the journal partition 58. Reconstructing the table 260 can start from the last valid sentinel, rather than from the beginning of the file, which greatly increases the speed of recovery. According to the preferred embodiment of the routine for reconstructing the table 260, the most recent "sentinel" object is located by reading backward from the end of the journal. This will be the last point at which the table 260 was still valid. The sentinel will contain a pointer to the disk file that stores the table 262 and the table 262 may then be loaded from this file. If the table 262 is missing or damaged, the routine then attempts to find a "sentinel" object check point that is earlier in the journal file. This process continues until a valid "sentinel" object is found or the beginning of the journal file is reached.

Next, the journal partition 58 is read, starting at the next object written to the journal partition 58 after the "sentinel," if any, is located that points to a valid table. For each subsequent object in the journal partition 58, the table 260 is updated. Finally, a new "sentinel" is created and the new table 260 is saved.

Optimization

The object orientation of this storage system enhances the efficiency of various operations. For example, the copending Application entitled "Method and Apparatus for Improved Information Storage and Retrieval System" filed Mar. 28, 1995, Ser. No. 08/383,752, discloses a database that comprises a table with rows and columns. The rows correspond to records and the columns correspond to fields. The intersection of the rows and the columns comprise cells, which correspond to the data items of the present invention. Thus, a cell is stored as a data object according to the teachings of the present invention. Certain database operations, such as I. Using shared data in a distributed or disconnected network II. replicating, synchronizing and merging data at the cell level, and merging indexes III. recovery of damaged or missing data IV. searching cells by column rather than by row, are enhanced by storing the database of the copending application according to the teachings of the present invention.

Furthermore, the physical arrangement of cells on the storage medium is flexible and can be adjusted for various requirements. For example, if a particular column or set of columns is searched regularly, the cells comprising these columns may be kept adjacent to each other in a partition. Alternatively, the cells may be separated from the main storage file and stored in a distinct file, called a 'stripe'.

The information contained in some data items is redundant and can be reconstructed from 'original' information corresponding to parent data items, as previously described. With reference to the copending Application entitled "Method and Apparatus for Improved Information Storage and Retrieval System" filed Feb. 3, 1995, Ser. No. 08/383, 752, for example, the contents of a folder, which is a record that points to a group of records, can be reconstructed by gathering all of the 'parent folder' attributes of the data items. Similarly, indexes and other navigation structures can often be reconstructed.

For these kinds of reconstructible data items, a special storage technique can be used. The contents of the data item are stored in a special location, distinct from the journal partition. This location may be reused every time the reconstructible data item is written which saves memory space and time. The journal then contains a pointer to this external location, instead of the actual data itself. If, for some reason, the external location is missing or damaged, the data item can be reconstructed using an appropriate method.

System Architecture

Figure 14:
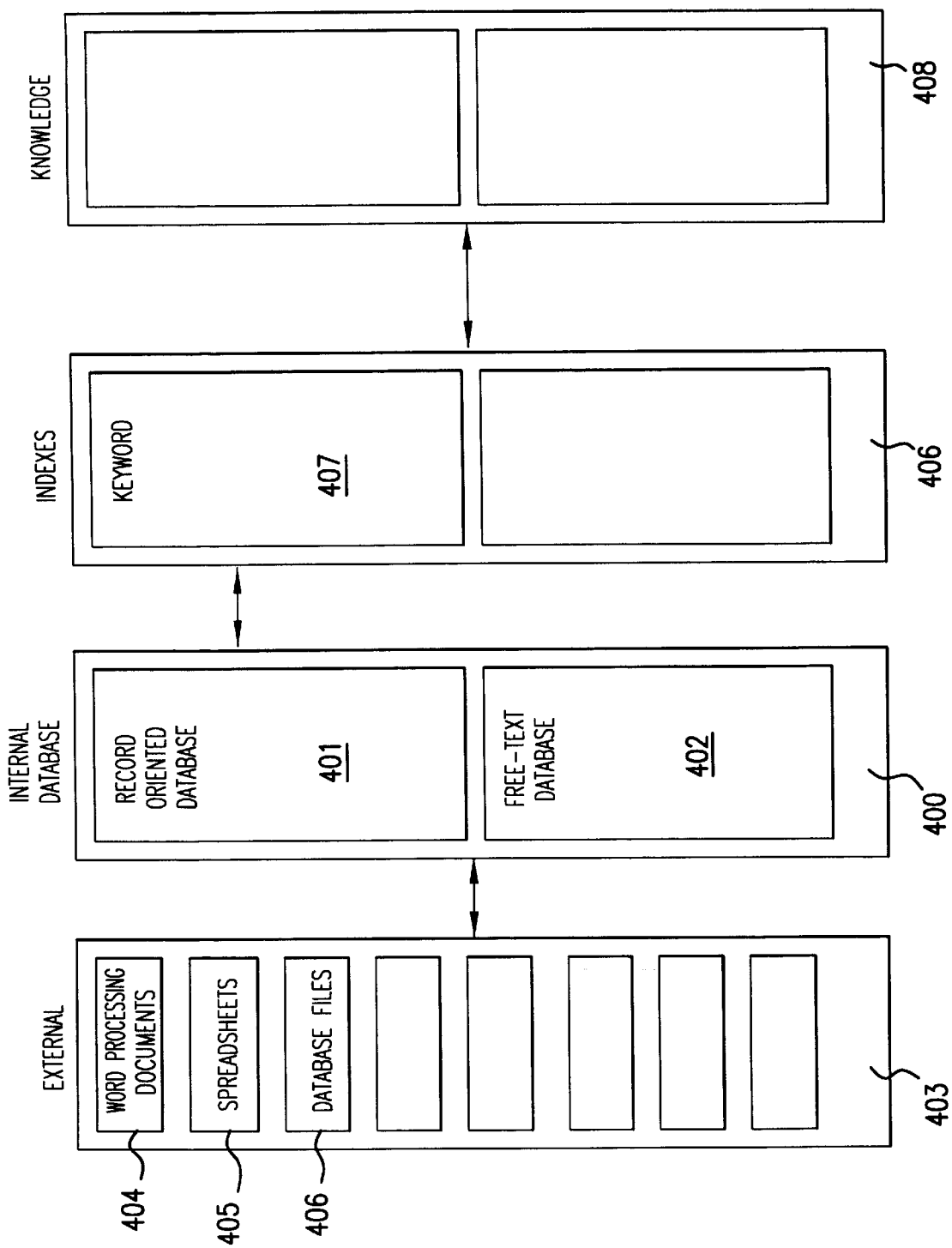
FIG. 14 is a block diagram illustrating the main components of the present invention.

FIG. 14 is a block diagram of the information storage and retrieval system of the present invention. As illustrated in the FIG., the present invention includes an internal database 400 that further includes a record oriented database 401 and a free-text database 402. Database 400 may receive data from a plurality of external sources 403, including word processing documents 404, spreadsheets 405 and database files 406. As will be described more fully below, the present invention includes an application support system that interfaces the external sources 403 with the database 400.

To efficiently retrieve information stored in the database 400, a plurality of indexes 406 including a keyword index 407 and other types of indexes such as phonetic, special sorting for other languages, and market specific such as chemical, legal and medical, store sorted information provided by the database 400. To organize the information in the indexes 406, a knowledge system 408 links information existing in the indexes 406.

The organization illustrated in FIG. 14 is for conceptual purposes and, in actuality, the database 400, the indexes 406 and the knowledge system 408 are stored in the same table, as will be described more fully below. This Specification will first describe the structure and features of the database 400. Next, the Specification will describe the index 406 and its implementation for searching the database 400. The Specification will then describe the knowledge system 408 that further enhances the index 406 by providing synonyms and other elements. Finally, the Specification will describe an interface between the external application programs 403 and the database 400, including a novel structured word processor and a novel password scheme.

FIG. 15 illustrates the storage and retrieval structure of the present invention. The storage and retrieval structure of the present invention comprises a table 409. The structure of the table 409 is a logical structure and not necessarily a physical structure. Thus, the memories 26 and 32 configured according to the teachings of the present invention need not store the table 409 contiguously.

The table 409 further comprises a plurality of rows 410 and a plurality of columns 420. A row corresponds to a record while a column corresponds to an attribute of a record and the defining characteristics of the column are stored in a row 411. The intersection of a row and a column comprises a particular cell.

Each row is assigned a unique object identification number (OID) stored in column 420 and each column also is assigned a unique OID, indicated in brackets and stored in row 411. For example, row 410 has an OID equal to 1100 while the column 422 has an OID equal to 101. As will be described more fully below, the OID's for both rows and columns may be used as pointers and a cell 412 may store an OID. The method for assigning the OID's will also be discussed below.

As illustrated in FIG. 15, each row, corresponding to a record, may include information in each column. However, a row need not, and generally will not, have data stored in every column. For example, row 410 corresponds to a company as shown in a cell 413. Since companies do not have titles, cell 414 is unused.

The type of information associated with a column is known as a 'domain'. Standard domains supported in most database systems include text, number, date, and Boolean. The present invention includes other types of domains such as the OID domain that points to a row or column. The present invention further supports 'user-defined' domains, whereby all the behavior of the domain can be determined by a user or programmer. For example, a user may configure a domain to include writing to and reading from a storage medium and handling operations such as equality testing and comparisons.

According to the present invention, individual cells may be accessed according to their row and column OID's. That is, the cell (or intersection between the rows and columns) is the unit of storage and management, not the record. (or row) as is standard in the prior art, Using the cell as the unit of storage improves many standard data management operations that previously required the entire object or record. Such operations include versioning, security, hierarchical storage management, appending to remote partitions, printing, and other operations.

Column Definitions

Each column has an associated column definition, which determines the properties of the column, such as the domain of the column, the name of the column, whether the column is required and other properties that may relate to a column. The table 409 supports columns that include unstructured, free text data.

The column definition is stored as a record in the table 409 of FIG. 15. For example, the "Employed By" column 415 has a corresponding row 416. The addition of rows that correspond to columns renders table 409 self-referential. New columns may be easily appended to table 409 by creating a new column definition record. The new column is then immediately available for use in existing records.

Dates

Dates can be specified numerically and textually. An example of a numerical date is "11/6/67" and an example of a textual date is "Nov. 6, 1967." Textual entries are converted to dates using standard algorithms and lookup tables. A date value can store both original text and the associated date to which the text is converted, which allows the date value to be displayed in the format in which it was originally entered.

Numbers

Numeric values are classified as either a whole number (Integer) or fractional number. In the preferred embodiment, Integers are stored as variable length structures, which can represent arbitrarily large numbers. All data structures and indexes use this format which ensures that there are no limits in the system.

Fractional numbers are represented by a <numerator/denominator> pair of variable length integers. As with dates, a numeric value can store both the original text ("4 ½ inches") and the associated number (4.5). This allows the numeric value to be redisplayed in the format in which it was originally entered.

Type Definitions

A record can be associated with a 'record type'. The record type can be used simply as a category, but also can be used to determine the behavior of records. For example, the record type might specify certain columns that are required by all records of that type and, as with columns, the type definitions are stored as records in the table 409. In FIG. 15, column 422 includes the type definition for each record. The column 422 stores pointers to rows defining a particular column type. For example, the row 416 is a "Field" type column and contains a pointer in cell 417 to a row 418 that defines "Field" type columns. The "Type Column" 422 of the row 418 points to a type called "Type," which is defined in a row 419. "Type" has a type column that points to itself.

Record types, as defined by their corresponding rows, may constrain the values that a record of that type may contain. For example, the record type 'Person' may require that records of type 'Person' have a valid value in the 'Name' column, the 'Phone' column, and any other columns. The type of a record is an attribute of the record and thus may change at any time.

Template Definitions

A template is a special record that comprises a description and a list of fields. For example, a Contact template might consist of the fields: "First Name", "Last Name", "Phone". Templates are used for conveniently labeling a group of fields. A template can be used for various purposes, such as determining which fields to use when editing a record, printing a record, searching for a record, or exporting a record. More sophisticated templates can contain layout information that is used when editing or printing a record.

As any record can contain any field, so any template can be applied to any record, even if some fields may be 'inappropriate' for the type of record. For example, when printing a collection of records, the same template may be applied to all the records in the collection, even if the records are of different types.

A record can be associated with a particular 'default template'. This template is used as the default when editing, printing, and exporting the record.

Creating a Unique OID

Figure 16:
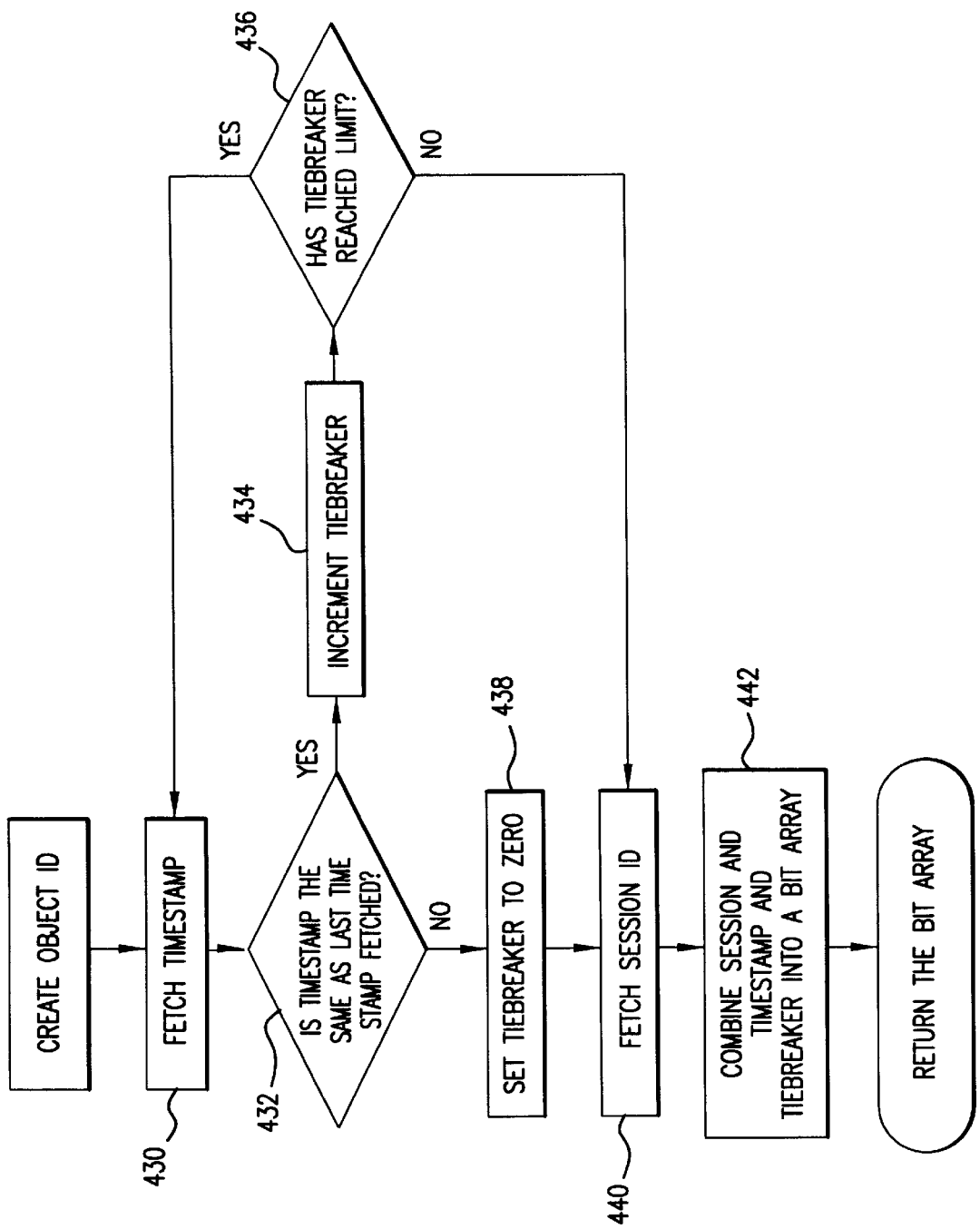
FIG. 16 is a flow chart for a method of computing object identification numbers (OID's) that define rows and columns in the table of FIG. 15.

As previously described, the system must generate a unique OID when columns and rows are formed. FIG. 16 is a flow chart of the method for assigning OID's.

At block 430 of FIG. 16, CPU 24 that is running the database program stored in the memory 26 requests a timestamp from the operating system. At block 432, the system determines whether the received timestamp is identical to a previous timestamp. If the timestamps are identical, block 432 branches to block 434 and a tiebreaker is incremented to resolve the conflict between the identical timestamps. At block 436, the system determines whether the tiebreaker has reached its limit, and, if so, the system branches to block 430 to retrieve a new time stamp. Otherwise, the system branches to block 440 where the system requests a session identification which is unique to the user session.

In the preferred embodiment, the session identification is derived from the unique serial number of the application installed on the users machine. For certain OID's which are independent of any particular machine, the session identification may be used to determine the type of object. For example, dates are independent of any particular machine, and so an OID for a date may have a fixed session identification.

Returning to block 432, if the timestamps are not identical, control passes to block 438 where the tiebreaker is set to zero and control then passes to block 440. As previously described, at block 440, the system requests a session identification which is unique to the user session. Control then passes to block 442 where the session identification, timestamp and tiebreaker are combined into a bit array, which becomes the OID. Since the OID is a variable length structure, any number of bits may be used, depending on the precision required, the resolution of the operating system clock, and the number of users. In the preferred embodiment, the OID is 64 bits long where the timestamp comprises the first 32 bits, the tiebreaker comprises the next 10 bits and the session identification comprises 22 bits.

The particular type of OID and its length is constant throughout a single database but may vary between databases. A flag indicating which type of OID to be used may be embedded in the header of each database.

OID Domains

OID domains are used to store OID's, which are pointers to other records. An efficient query can use these OID's to go directly to another record, rather than searching through columns.

If a user wishes to search a column to find a record or records with a certain item in the column, and does not know the OID of the item, the present invention includes a novel technique for determining an OID from the textual description. Conversion from text to an OID may also be necessary when a user is entering information into a record. For example, in FIG. 15, the user may be entering information in the "Employed By" column 415, and wish to specify the text "DEXIS" and have it converted to OID #1100. For this purpose, special columns are required that provide a definition for how the search and conversion is performed.

Figure 17:
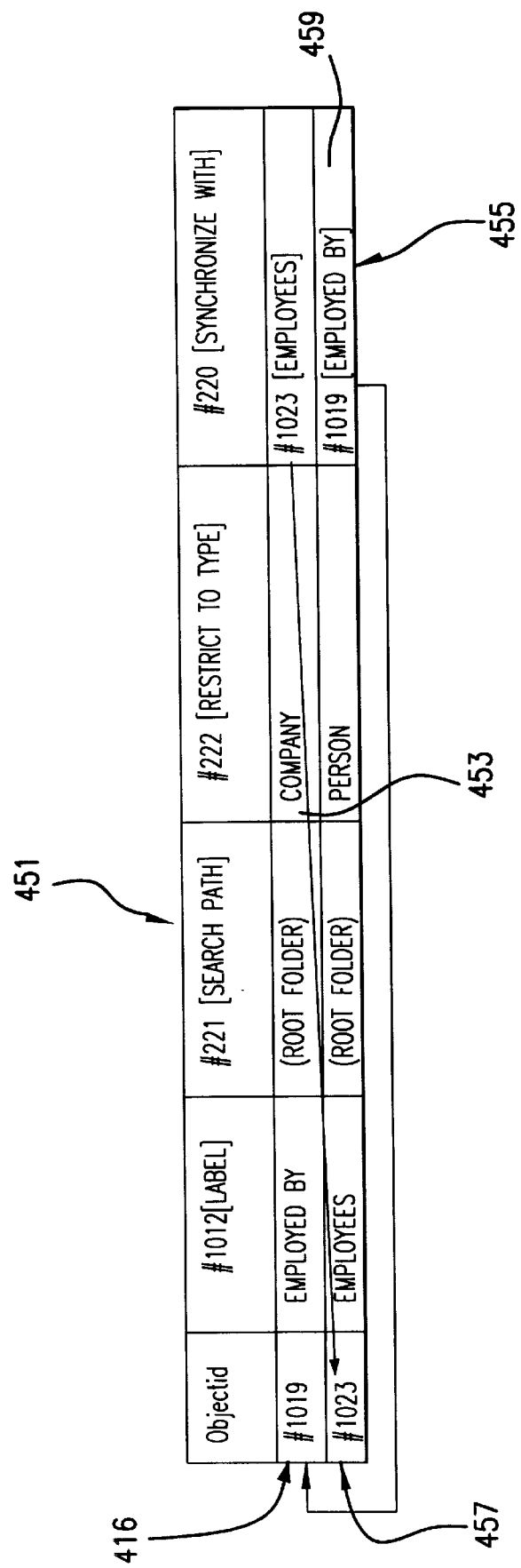
FIG. 17 is a part of the table of FIG. 14 illustrating the column synchronization feature of the present invention.
Figure 18:
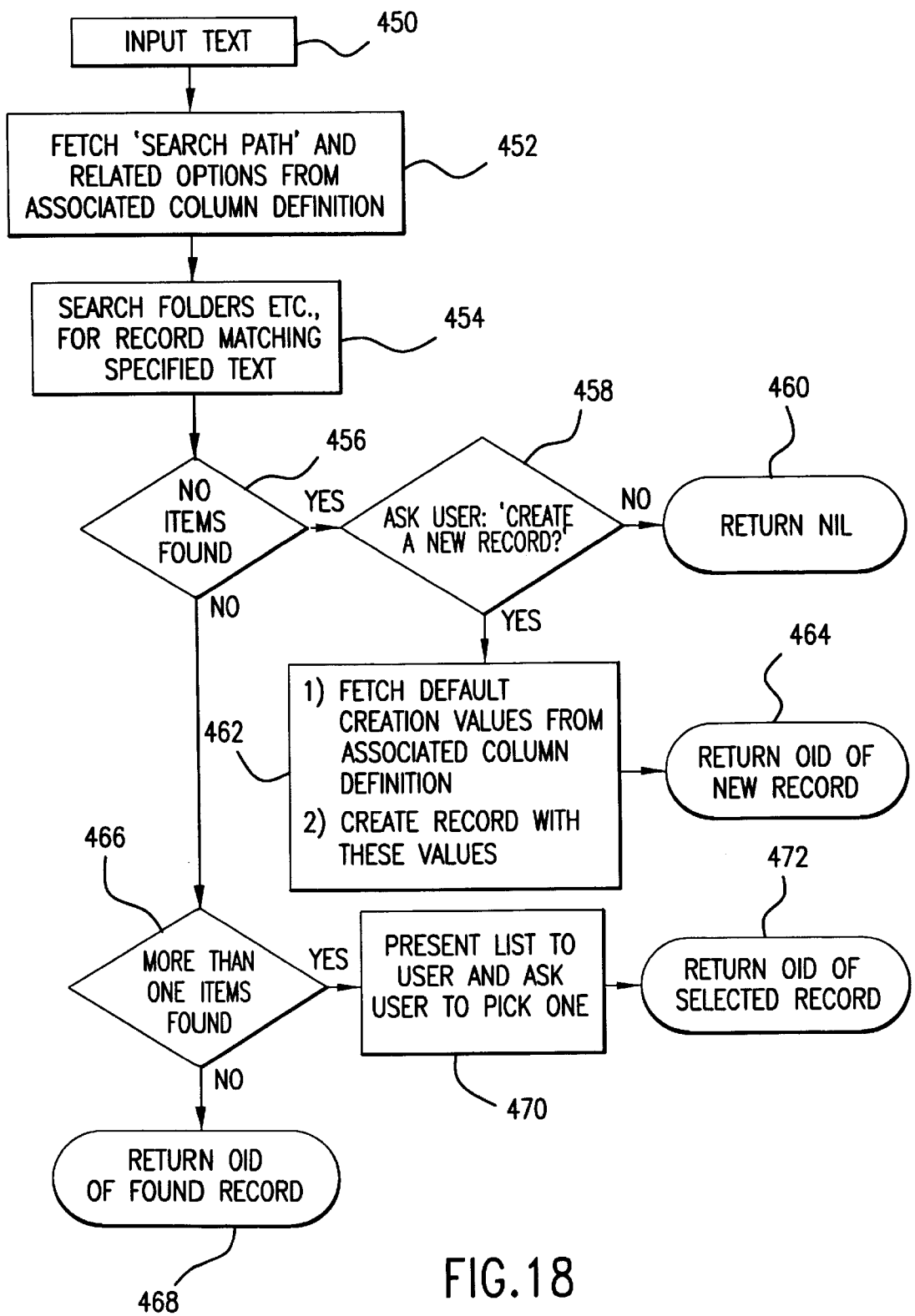
FIG. 18 is a flow chart for a method of searching the table of FIG. 15.

FIG. 18 is a flow chart for searching the table 409 configured according to the structure illustrated in FIG. 17. At block 450, a user enters text through the keyboard 30 or mouse 45 for a particular column that the user wishes to search. At block 452, the system retrieves the search path for the column to be searched from the information stored in column 451 as illustrated in FIG. 17. Continuing with the above example, a cell 453 in the row 416 contains the search path information for the "Employed By" column 415 of FIG. 15. The search path information for the "Employed By" field indicates that the folders called "\contacts" and "\departments" should be searched for a company with the dabel "DEXIS."

Returning to FIG. 17, the system searches table 409 according to the retrieved search path information. For each folder specified in the search path, the routine searches for a record that has an entry in the label column 423 of FIG. 15 that is the same as the text being searched for, and is of the same class, as indicated in column 422 of FIG. 15. Folders will be further described below.

At block 456, the system determines whether it has found any items matching the user's search text. If no items have been found, at block 458, the system prompts the user on the display screen 37 to create a new record. If the user wishes to create a new record, control passes to block 462 and the system creates a new record. At block 464, the OID of the new record is returned. If the user does not wish to create a new record, a "NIL" string is returned, as shown at block 460.

If the system has located at least one item, the system determines whether it has found more than one item, as illustrated in block 466. If only one item has been located, its OID is returned at block 468. If more than one item has been located, the system displays the list of items to the user at block 470 and the user selects a record from the list. At block 472, the OID of the selected record is returned, which, in the above example, is #1100, the OID of the record for the company "DEXIS."

In alternate embodiments, various features may be added to the search mechanism as described with reference to FIG. 18. For example, further restrictions may be added to the search; the search may be related by allowing prefix matching or fuzzy matching instead of strict matching; and the search may be widened by using the 'associative search' techniques described below.

Two-Way Synchronized Links

Records may have interrelationships and it is often desirable to maintain consistency between interrelated records. For example, a record including data for a company may include information regard employees of that company, as illustrated in row 410 of FIG. 15. Similarly, the employees that work for that company may have a record that indicates, by a pointer, their employer, as illustrated by row 421 of FIG. 15. Thus, the employee column of a company should point to employees whose employer column points to that company. The present invention includes a synchronization technique to ensure that whenever interrelated records are added or removed, the interrelationships between the columns are properly updated.

The system synchronizes interrelated records by adding a "Synchronize With" column 455 to the table 409 as illustrated in FIG. 17. Since the value in the columns defines the relatedness between records, the rows 416 and 457 corresponding to columns contain information within the "Synchronize With" column 455 that indicates which other columns are to be synchronized with the columns corresponding to rows 416 and 457. With reference to FIG. 17, the "Employed By" column 415 is synchronized with the "Employees" column by an OID pointer in the "Synchronize With" column 455 to the "Employees" column, represented by row 457. Similarly, the "Employees" column is synchronized with the "Employed By" column 415 by a pointer in the "Synchronize With" column 455 to the "Employed by" column 415, represented by row 416. Thus, whenever an employee changes companies, such that the employee's "Employed By" column changes, the "Employee" column of the previous employer is updated to eliminate the pointer to the ex-employee and, correspondingly, the addition of the employee in the "Employed By" field of the new employer. Synchronization may need to occur whenever a column is changed, whether by addition or subtraction of a reference to another column, or when entire records are added or eliminated from the table 409.

Figure 18A:
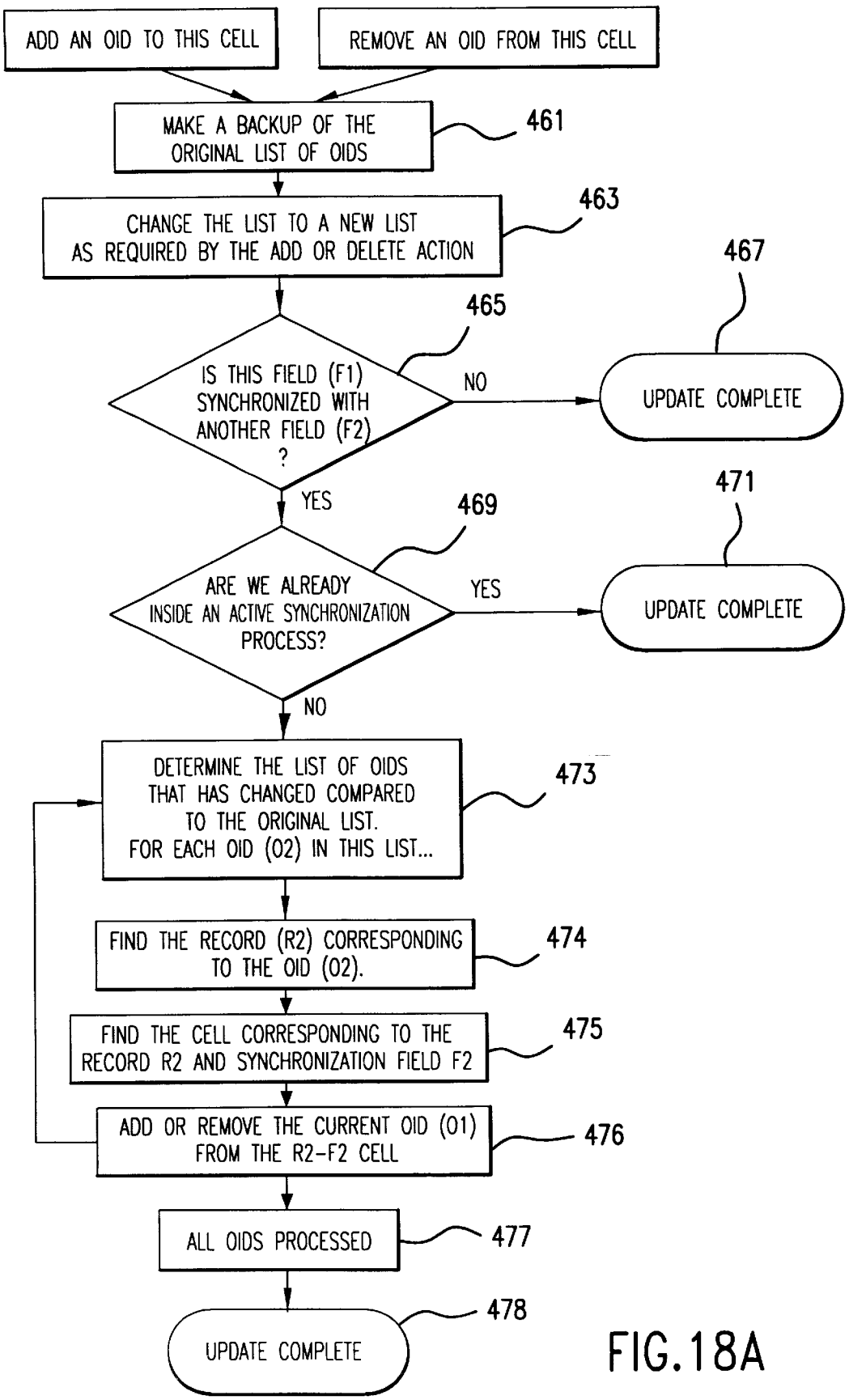
FIG. 18A is a flow chart for synchronizing columns of the table of FIG. 15.

FIG. 18A is a flow chart for synchronizing records when a user adds or deletes a record. At block 461, the system makes a backup of the original list of references to other rows, which are simply the OID's of those other rows, so that it can later determine which OIDS have been added or removed. Only these changes need to be synchronized. At block 463, the system generates a new list of references by adding or deleting the specified OID. At block 465, the system determines whether the relevant column is synchronized with another column. If it is not, then the system branches to block 467 and the update is complete. If the column is synchronized with another column, the system determines whether it is already in a synchronization routine. If this were not done, the routine would get into an endless recursive loop. If the system is already in a synchronization routine, the system branches to block 471 and the update is complete.

Otherwise, the system performs actual synchronization. At block 473, the system finds an OID that has been added or subtracted from the column (C1) of the record (R1) being altered. The system retrieves the record (R2) corresponding to the added or subtracted OID at block 474. The system determines the synchronization column (C2) of the column (C1) at block 475 and locates that field in the added or subtracted OID. For example, if an employer is fired from a job, and the employer's "Employed By" field changed accordingly, the system would look up the value of the "Synchronize With" column 455 for the "Employees" column which is contained in the cell 459 as illustrated in FIG. 17. Since cell 459 points to the "Employed By" field, the system locates the "Employed By" field of the record for the fired employee. At block 476 of FIG. 18A, the located cell, (R2:C2), is updated by adding or subtracting the OID. Continuing with the above example, the "Employed By" field of the employee would be changed to no longer point to the previous employer by simply removing the employer's OID from that field. The system branches back to block 473 to update any other OID additions or subtractions. If the system has processed all of the OID's, then the routine exits as illustrated at blocks 477 and 478.

Figure 18B:
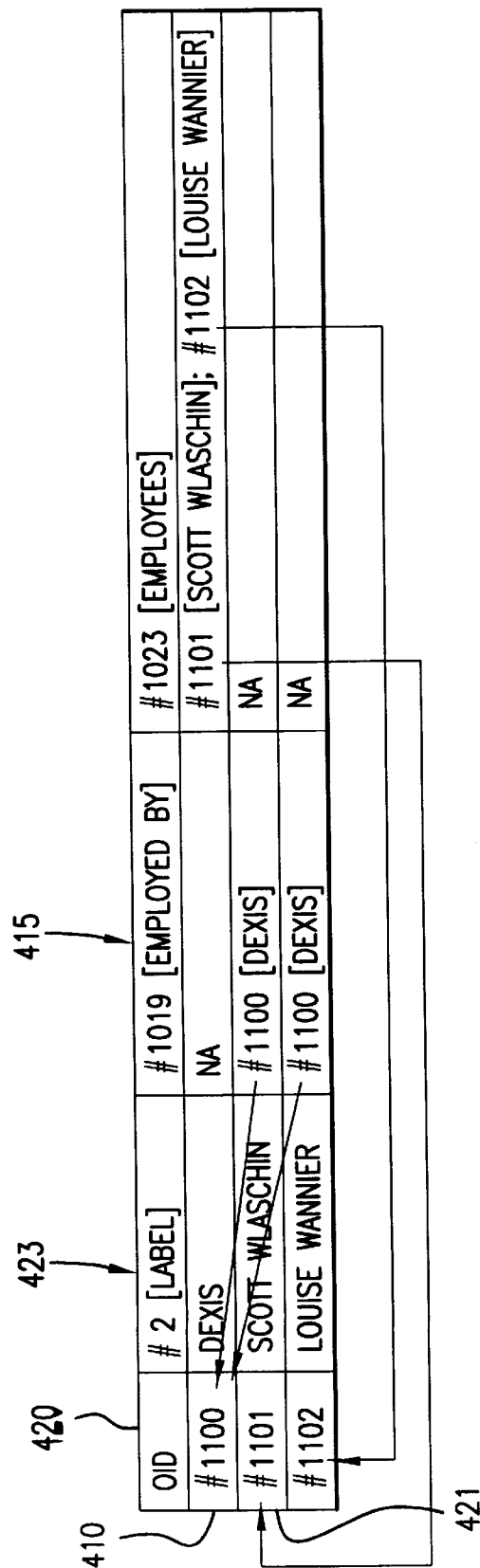
FIG. 18B illustrates the results of column synchronization.

FIG. 18B illustrates the results of column synchronization of the "Employed By" field and the "Employees" field. As shown, the pointers in the records of these two columns are consistent with one another.

Columns Within Columns

Figure 19A:
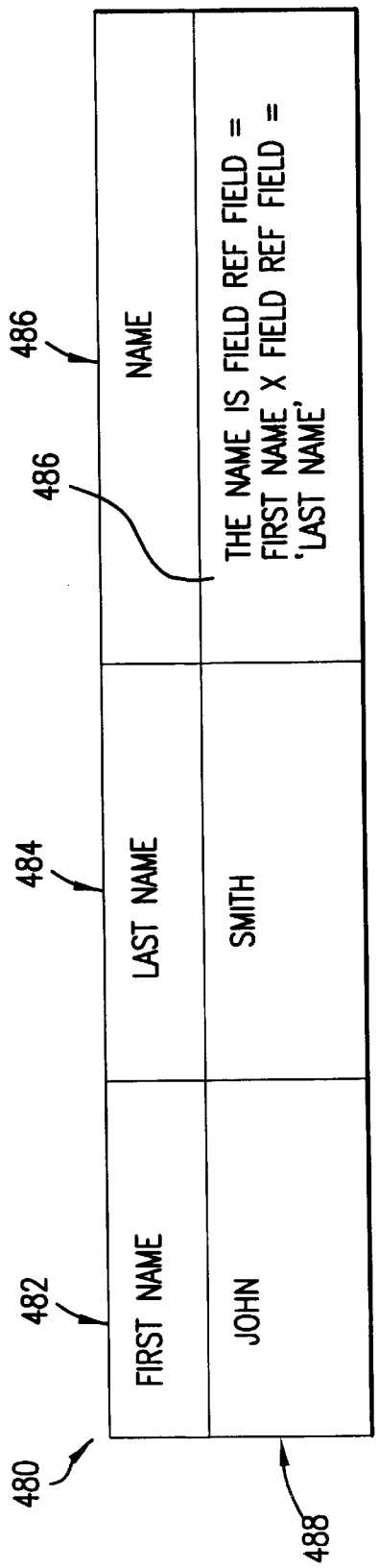
FIG. 19A illustrates a reference within one column to another column.
Figure 19B:
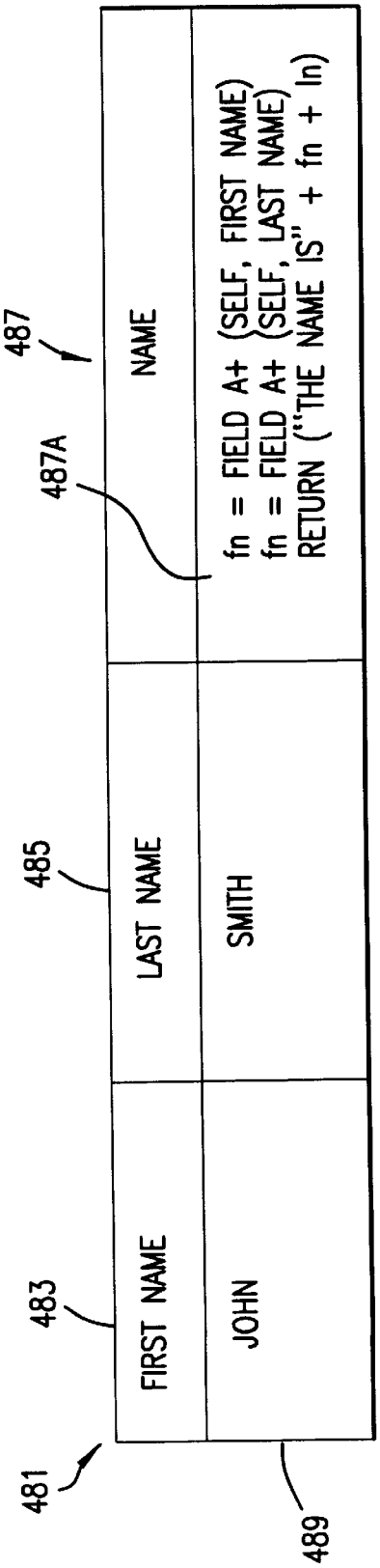
FIG. 19B illustrates an alternate embodiment for referring to another column within a column.

A column may contain within it a reference to another column in the same record. For example, a 'name' column may contain a reference to both a 'first name' and a 'last name' column. The value of the 'name' column can then be reconstructed from the values of the other two columns. FIGS. 19A and 19B illustrate two possible implementations for reconstructing a value from one or more columns within the same record.

FIG. 19A illustrates a table 480 that includes a "First Name" column 482, a "Last Name" column 484 and a "Name" column 486. A record 226 for "John Smith" has the first name "John" in the "First Name" column 482 and the last name "Smith" in the column 484. The name field 486A returns the text "The name is John Smith" by referencing the fields in brackets, according to the format <fieldRef field= 'Column Name'> as shown in column 486.

FIG. 19B employs a variant of the referencing scheme illustrated in FIG. 19A. FIG. 19A illustrates a table 481 that includes a "First Name" column 483, a "Last Name" column 485 and a "Name" column 487. A record 489 for "John Smith" has the first name "John" in the "First Name" column 483 and the last name "Smith" in the column 485. The name field 487A returns the text "The name is John Smith" by referencing the fields by defined variables 'fn' and 'ln' as shown in column 487. The variables are defined according to the format variable:=fieldat (parameter, 'Column Name') and the variables may be referenced in a return statement as shown in column 487.

Record Contents

As previously described, a given row may contain values for any column. However, to determine all of the columns that might be used by a record would involve scanning every possible column. To avoid this problem, in the preferred embodiment, the table 409 illustrated in FIG. 15 includes a "RecordContents" column that indicates those columns within which a particular record has stored values.

FIG. 20 illustrates the table 409 with a "RecordContents" column 427 that includes pointers to the columns containing values for a particular record. For example, the "RecordContents" column 427 for row 410 has pointers to the column 423 and a column 425 but does not have a pointer to the column 415 because the row 410 does not have a value for the column 415. As previously described, since every column has a corresponding row that defines the column, the "RecordContents" column 427 has a defining row 429. Like any cell, the cell containing the record contents can be versioned, providing the ability to do record versioning.

Folders

To provide increased efficiency in managing information, the table 409 may include a data type defined as a folder. FIG. 21 illustrates the structure of a folder which includes a "Parent Folder" column 490 and a "Folder Children" column 492. A folder has a corresponding record. For example, a folder entitled "Contacts" has a corresponding row 494 as illustrated in FIG. 10. The "Folder Children" column 492 of the "Contacts" folder includes pointers to those records that belong to the folder. Similarly, those records that belong to a folder include a pointer to that folder in the "Parent Folder" column 490.

A particular record can belong to any number of folders.

The folder structure illustrated in FIG. 21 facilitates searching. As previously described, a column may be searched according to a folder specified in the column definition. If a folder is searched, the system accesses the record corresponding to the folder and then searches all of the records pointed to by that folder.

Further, the synchronization feature described above may be used to generate the list of items in a folder. For example, in FIG. 21, the 'Folder Parent' and 'Folder Children' columns may be synchronized. When the 'Folder Parent' field 490A for record 421 is set to reference the 'Contacts' folder represented by row 494, the list of items in the 'Contacts' folder ('FolderChildren') is automatically updated to store a reciprocal reference to the record represented by row 421 by including its OID, 1101, in the "Folder Children" column 492.

Automatic folders

Certain folders are defined such that their contents are automatically determined. This is an 'index' folder or 'query' folder, depending on the type of definition. An index folder contains all records that contain a valid value in a certain field.

For example, a "People" folder may defined such that it automatically contains all records of type "Person".

Furthermore, these definitions can be combined into a more complex definition, called a query. An example of such a folder is a folder that automatically contains a) all records of type "Person" that also b) contain the word "California".

Such automatic folders facilitate the use of the system by automatically filing and organizing records of interest, without requiring an explicit action from the user.

Text Indexing System

The present invention includes an indexing system that provides for rapid searching of text included in any cell in table 409. Each key phrase is extracted from a cell and stored in a list format according to a predefined hierarchy. For example, the list may be alphabetized, providing for very rapid searching of a particular name.

Figure 22:
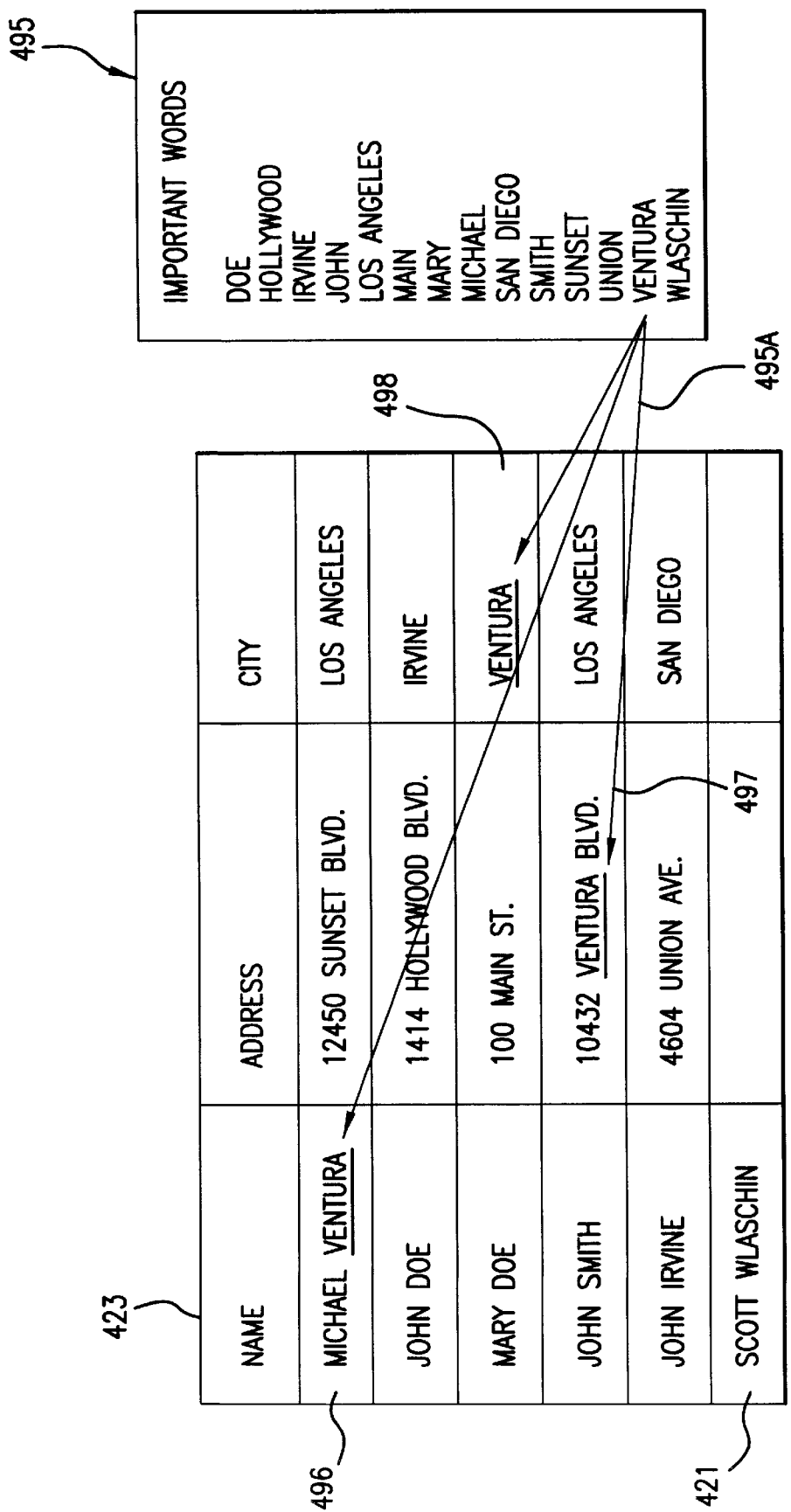
FIG. 22 illustrates the correspondence between cells of the table of FIG. 15 and a sorted key word index.

FIG. 22 illustrates the extraction of text from the table 409 to a list 495. The list 495 is shown separately from the table 409 for purposes of illustration but, in a currently preferred embodiment of the present invention, list 495 comprises part of table 409. List 495 stores cell identification numbers such as cell identification number 495A for each word in the list where a cell identification number may be of the format <record OID, column OID>. For example, the word "Ventura" occurs in cells 496, 497 and 498 that correspond to different rows and different columns. The word "Ventura" in the list 495 contains a pointer, or cell identification number, to cells 496, 497 and 498.

Figure 23:
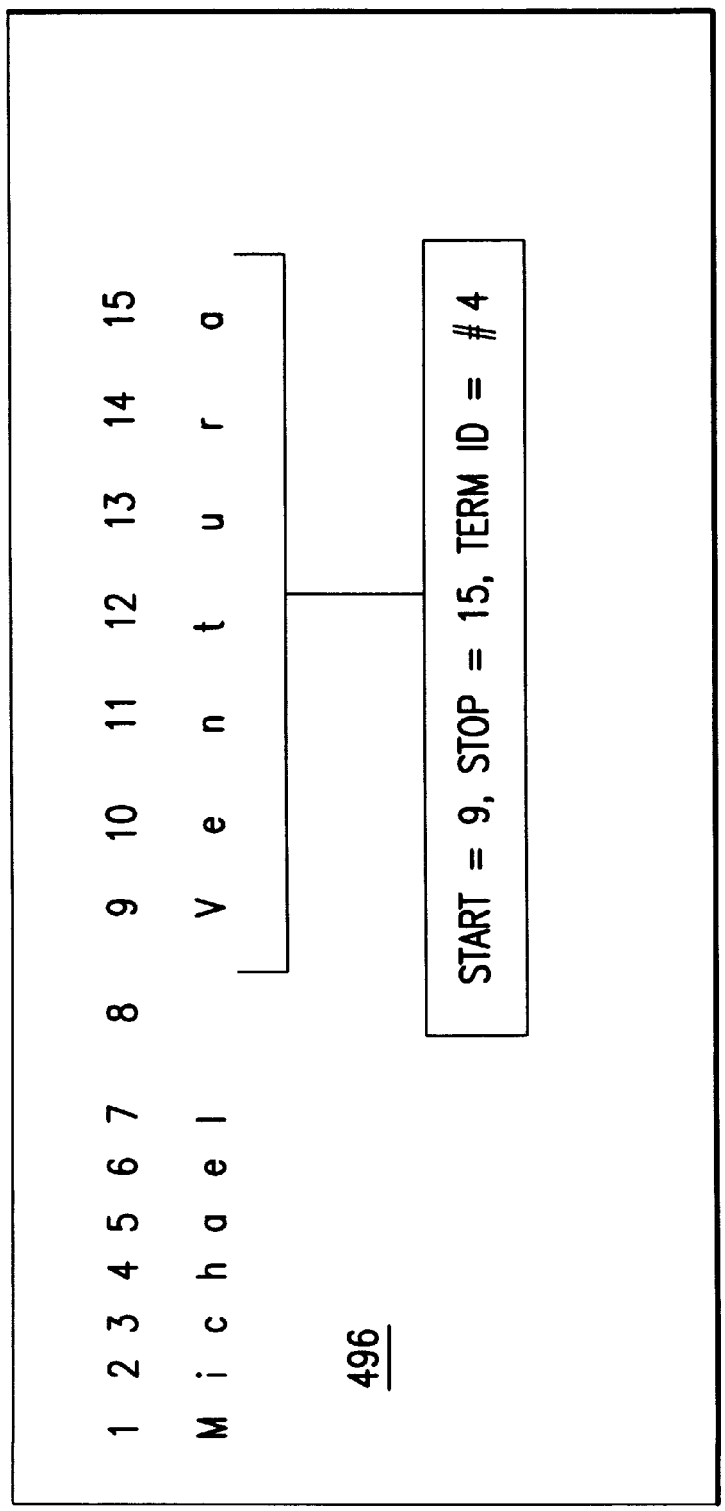
FIG. 23 illustrate the "anchors" within a cell that relate a word in a cell to a key word index record.

Similarly, each cell stores the references to the key phrases within it using 'anchors'. As illustrated in FIG. 23, an anchor contains a location (such as the start and stop offset within the text), and an identification number. Both the text and the anchor are stored in the cell 496. Other kinds of domains also support anchors. For example, graphical images support the notion of 'hot spots' where the anchor position is a point on the image.

As previously described, each key phrase is stored as a record in the database and the OID of the record equals the identification number described with reference to FIG. 23. One column stores the name of the key phrase and another stores the list of cell identification numbers that include that phrase. Key phrases may have comments of their own, which may also be indexed.

Figure 24:
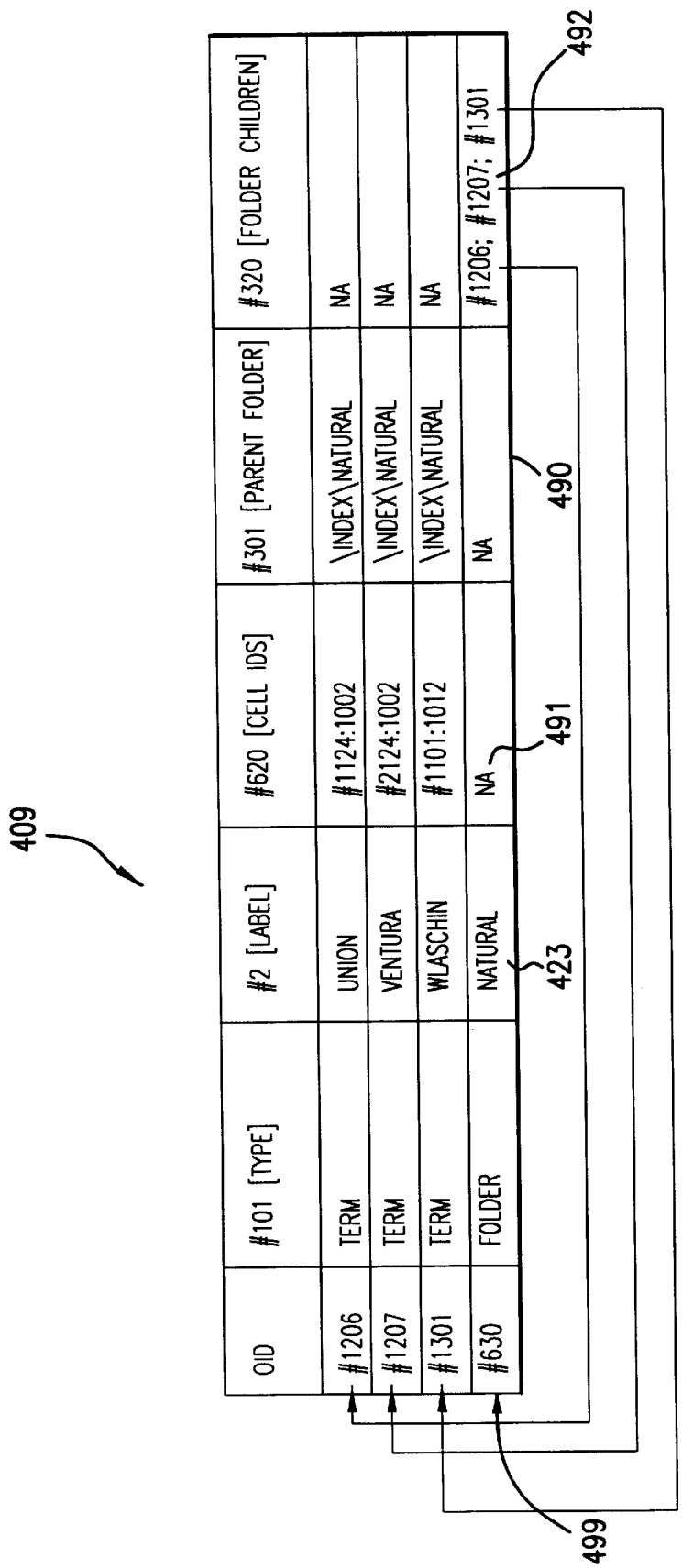
FIG. 24 illustrates key word index records stored in the table of FIG. 15.

The sorted list 495 as illustrated in FIG. 22 is stored as a Folder, as illustrated in FIG. 24. A cell identification field 491 maintains the cells that include the term corresponding to that record. The "Parent Folder" column 490 for each of the terms on the list 495 indicates that the parent folder is an index with a title "Natural." The "Natural" folder has a row 499 that has pointers in the "Folder Children" column 492 to all of the terms in the list 495.

The "Natural" folder corresponds to an index sorted by a specific type of algorithm. Computer programs generally sort using a standard collating sequence such as ASCII. The present invention provides an improvement over this type of sorting and the improved sorting technique corresponds to the "Natural" folder. Records in the "Natural" folder are sorted according to the following rules:

1) A key phrase may occur at more than one point in the list. In particular:
1a) Key phrases may be permuted and stored under each permutation. For example: 'John Smith' can be stored under 'John' and also under 'Smith'. Noise words such as 'a' and 'the' are ignored in the permutation.
1b) Key phrases which are numeric or date oriented may be stored under each possible location. For example: '1984' can be stored under the digit '1984' and also under 'One thousand, nine hundred . . .', and 'nineteen eighty four'.
2) Numbers are sorted naturally. For example, '20' comes after '3' and before '100'.
3) Prefixes in key phrases are ignored. For example, 'The Big Oak' is sorted under 'Big'.
4) Key phrases are stemmed, so that 'Computers' and 'Computing' map to the identical key phrase record.

The preferred embodiment of the routine for generating positions for entering the key phrases into the 'Natural' folder is as follows:

1) Capitalize the key phrase to avoid case sensitivity problems. For example: 'John Smith the 1st' becomes 'JOHN SMITH THE 1ST'.
2) Each word in the key phrases is stemmed using standard techniques. Eg "COMPUTERS" becomes "COMPUT".
3) Permute the key phrase. This results in a new set of multiple key phrases based on the original key phrase. For example 'JOHN SMITH THE 1ST' produces the set {'JOHN SMITH THE 1ST'; 'SMITH THE 1ST JOHN'; 'THE 1ST JOHN SMITH'; '1ST JOHN SMITH THE'}.
4) Noise prefixes are eliminated. In the example above, the third entry, 'THE 1ST JOHN SMITH', is eliminated. If no phrases are left after elimination, the original phrase is used. For example, an entry for "TO BE OR NOT TO BE" would be preserved even if all noise words were eliminated.
5) For each result, numbers and dates are expanded to all possible text representations, and text representations are converted to numeric. For example: '1ST JOHN SMITH THE' generates the set: {'1ST JOHN SMITH THE'; 'FIRST JOHN SMITH THE'}
6) Finally, each modified key phrase is used to determine the position of a reference to the main key phrase record, and an entry is made in the folder accordingly. For example, '1ST JOHN SMITH THE' is stored between '1' and '2', while 'FIRST JOHN SMIT THE' is stored after 'FIR' and before 'FIS.'

FIG. 33*a* illustrates the results of a prior art sorting algorithm while FIG. 33*b* illustrates the results of a sorting algorithm according to the present invention.

Extracting the Key Phrases

To generate a sorted list, the system must first extract the key phrases or words from the applicable cells. Various combinations of key phrase extraction can be used.

In full text extraction, every word is indexed, which is typical for standard text retrieval systems. In column extraction, the whole contents of the column are indexed which corresponds to a standard database system. According to a third type of extraction, automatic analysis, the contents of the text are analyzed and key phrases are extracted based on matching phrases, semantic context, and other factors. Finally, in manual selection extraction, the user or application explicitly marks the key phrase for indexing.

When automatic analysis is used, the 'key phrase' anchors are automatically updated whenever the text in the cell changes. This is advantageous as it removes the necessity for manually linking cells when data changes.

The Use of Fields to Support Text Indexing

As each field has its own field definition, each field can define how it is text-indexed. For example, the "Last name" field may be analyzed so that it's entire contents is considered important, and indexed, while the "Phone" field may be analyzed so that it's entire contents is considered unimportant, and never indexed.

The combination of structured information and text allows various combinations of key phrase extraction to be used differently for each individual cell in a record, allowing the user to select the most suitable combination. In particular, certain fields can be defined such that links based on key phrases are automatically created for data in those fields, without user intervention.

The Advantages of Storing Links in the Database

Publication of database material often requires the inclusion of links between data items. Traditionally, the links have been kept separate from the data, necessitating the relinking of the data items every time the material is prepared for publication. By storing the links with the data, and by automatically updating the links, the current invention eliminates the need for two steps. This is particularly advantageous when publishing in a format that supports links, but is hard to maintain, such as Hypertext Markup Language (HTML). Furthermore, the database system can be used a single repository for generating many different kinds of data formats that involve links.

Date Indexing System

The date indexing scheme is very similar to the text indexing scheme as previously described. Important dates are extracted from the text and added to an 'Important Date' list. Each important date is represented by a 'Important Date' record. The 'Important Date' records are stored in a 'Important Dates' folder, which is sorted by date.

The important dates are extracted from the text. The system may search for numeric dates, such as '4/5/94' or date-oriented text, such as "Tomorrow", "next Tuesday" or "Christmas". FIG. 34 illustrates the correspondence between cells of the table of FIG. 15 and a sorted date index.

Important Date records are assigned special predetermined OIDS since they always have the same identity in any system. Assigning predetermined OID's to dates allows Important Dates to be shared across systems. The predetermined OID is generated by using a special session identification number that signifies that the OID is an Important Date. In this case, the timestamp represents the value of the Important Date itself, not the time that it was created.

Associative Queries

Figure 25:
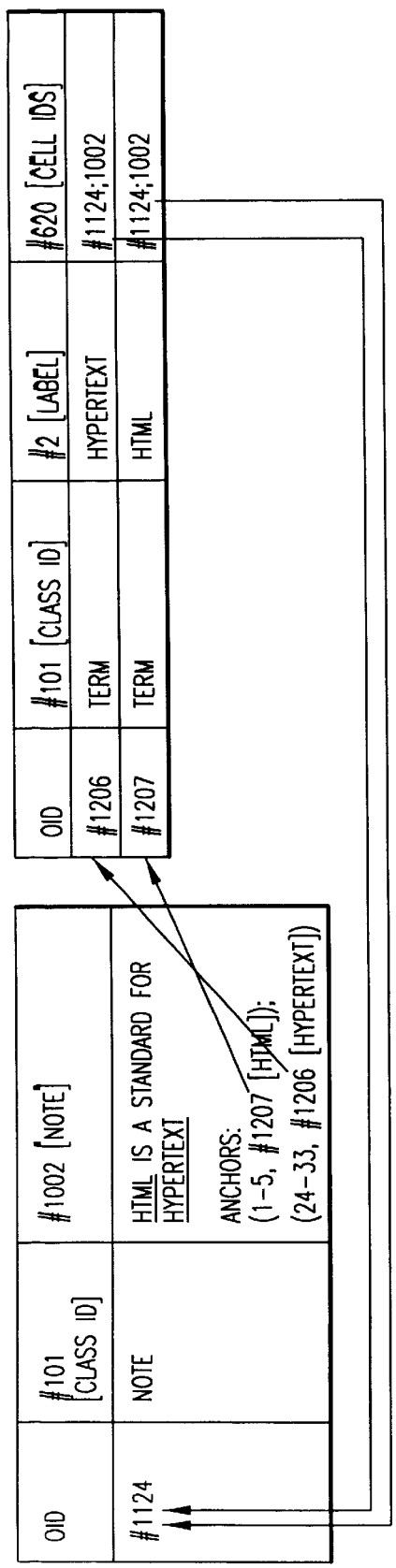
FIG. 25 illustrates the relationship between certain data records and key word index records.

As previously described, a sorted key word list is generated from the text in cells and list stored in a folder whose records point to the text cells. The associations between the list of records with text and the list of key phrases is two-way since the cells that include text point to the key words. FIG. 25 illustrates this two way correspondence. Each record can point to multiple key phrases, and each key phrase can point to multiple records.

Figure 26:
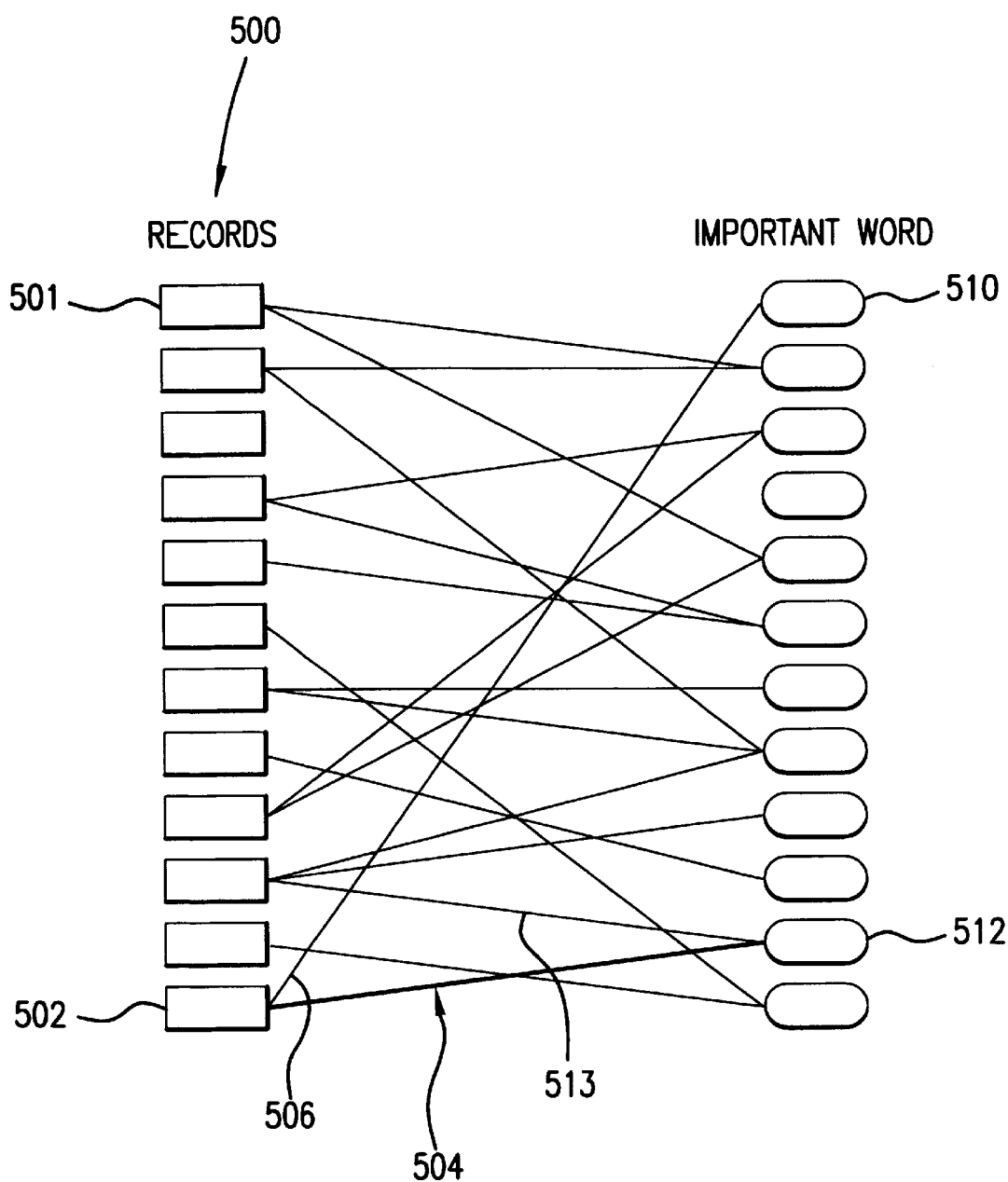
FIG. 26 illustrates the relationship of FIG. 25 in graphical form.

FIG. 26 is a graphical representation of the two way association between records and the key word list. Each record such as record 501 in a plurality of records 500 may point to one or more important word entries such as word entry 510. Similarly, each important word entry may point to one or more records. A single level search involves starting at one node such as 502(on either side of the graph) and following the links such as link 504 to the node on the other side such as node 512. For example, a user may wish to find the records including the word "Shasta." First, the important word index would be accessed to find the word "Shasta" and the records pointed to by this word would then be retrieved. This search is indicated by the arrows 504 and 513 where word "Shasta" corresponds to node 512. Similarly, a user may wish to locate all of the important words included in a particular record, indicated by the links 504 and 506.

The search can be extended by repeatedly following the links back and forth to the desired level. FIG. 27A illustrates this concept. As an example, the term "Shasta" may correspond to a dog with extraordinary intelligence such that in one record, "Shasta" is described as a dog and another record, 'Shasta' is described as a genius. If the user wishes to find the words associated with 'Shasta', the system locates cell 508, "Shasta" in the "Important Words" folder 503 which points to records such as records 505 and 507 including the word "Shasta." In turn, records 505 and 507 pointed to contain pointers to the "Important Words" list for each indexed word in the record. Since "Shasta" appears with "dog" and "genius" in the records, these words are retrieved by the system.

Figure 27B:
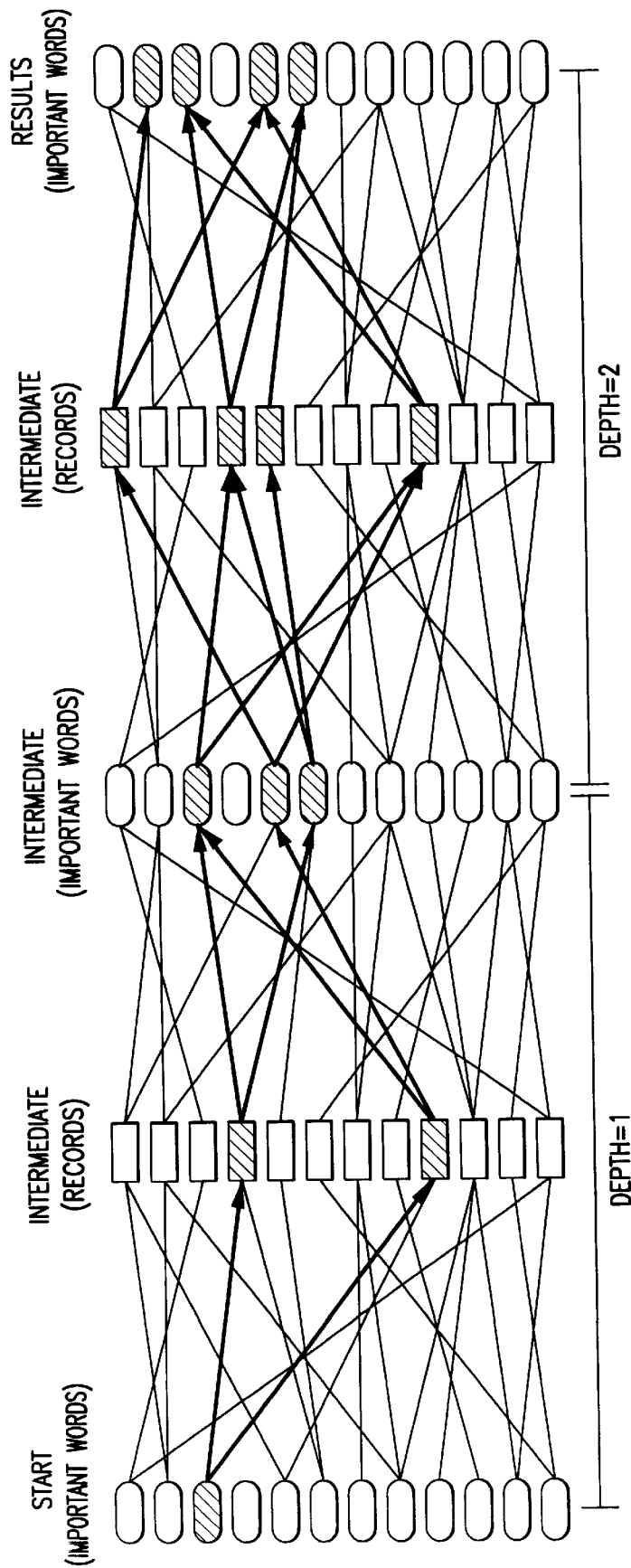
FIG. 27B illustrates a further extended search in graphical form.

This type of searching may be extended indefinitely. FIG. 27B illustrates an additional level of searching. Continuing with the above example, the word "genius" may occur in records referring to Dirac, and the word "dog" associated with "Checkers," such that the multilevel search illustrated in FIG. 27B results in a retrieval of "Dirac" and "Checkers" when provided with the word "Shasta."

A relevance ranking can be created based on weights associated with each link and type of key word, and the records can be displayed in order of descending relevance. In the preferred embodiment, if two or more nodes are used as the starting point, the relevance is based on the distance from all nodes. In this way, only nodes which are near all the initial nodes will have a high relevance. Many other relevance rankings apart from distance may be used.

To refine the search, filters can be used to constrain the links that are followed. For example, the search may be filtered such that only the type "Person" is listed such that, in the above example, Shasta will be associated with Dirac but not Checkers.

Knowledge Base and Thesaurus

A currently preferred embodiment of the present invention includes a knowledge base and thesaurus to further improve searching capabilities.

Each important word record (term) included within the thesaurus contains a pointer to a 'concept' record. Each concept record contains pointers to other concept records, and to the terms that are included within the bounds of that concept. FIG. 28 illustrates the structure of the thesaurus. Table 409 includes a "Parent Concept" column 522, a "Concept Name" column 524, a "Synonyms" column 526, a "More Specific Terms" column 528, a "More General Terms" column 530 and a "See Also" column 532. A concept record 520 defines the concept "IBM" and the Synonyms column 526 points to records that are synonymous with IBM, a record 521 with a label field with the value "IBM" and a record 523 with a label field with the value "International Business Machines." The records 521 and 523 have pointers in the "parent concept" field that point to the parent concept record 520.

The thesaurus structure illustrated in FIG. 28 provides for greater flexibility than exact synonyms. The "More Specific Terms" column 528 of the concept record 520 associated with "IBM" points to a concept record 525 associated with the IBM PC with an assigned weight of 100%, where the weight percentage reflects the similarity between the initial term "IBM" and the related term "IBM PC." Similarly, the "More General Terms" column 530 of the concept record 520 associated with "IBM" points to a concept record 527 associated with Computer Companies with an assigned weight of 60%. The "See also" column 532 points to a record 529 associated with the concept "Microsoft" with a weight of 70%, where the weight percentage reflects the similarity between the initial term "IBM" and the related term "IBM PC."

The Thesaurus illustrated in FIG. 28 enhances the searching mechanisms previously described with reference to FIGS. 25–27B. The system first locates the record associated with a key word and locates the parent concept record pointed to by the key word record. The system may then follow some or all of the pointers in the columns 526, 528, 530 and 532 and return of the OID's stored in the 'Concept Name' column 524.

Since key phrases and concepts are stored as records in this system, any other columns may be used to extend the knowledge and information stored therein. In particular, through the use of OID's, the system can store any kind of relationship, including relationships other than thesaural relationships, between key phrases, concepts and other records.

Application Support

The database of the present invention has been described without reference to its interface with applications that may use the invention as their primary storage and retrieval system. As previously described with reference to FIG. 14, the present database includes an interface to support applications programs. Components in the application support system include external document support, hypertext, document management and workflow, calendaring and scheduling, security and other features.

Further, the present invention includes various user interface components that allow have been developed to provide full access to the structure of the database of the present invention. In particular, a new kind of structured word processor will be presented. The Specification will describe each component of the application support system separately.

External Documents

The present invention supports indexing of external documents. The table 409 stores the filenames of documents, such as word processor documents, where the contents of the files are not directly stored in the database. The documents names may be stored in a column with a specialized "External Document" domain. The external documents may reside in the mass memory 32 or on a multi-source that interfaces with the system through device control 36.

To index documents external to the table 409, prior to processing, an external document is converted into a plain text format. Key phrases are then extracted as previously described. In particular, fields in the text can be determined and mapped to fields within the database. For example, a 'Memo' document may contain the text: 'To: John Smith. From: Mary Doe'. This text can be mapped to the fields called 'to' and 'from', and the values of these fields set accordingly. The analysis of the text in this way can be changed for different types of external documents such as memos, legal documents, spread sheets, computer source code and any other type of document. For each extracted key phrase, a start and stop point within the text is determined. A list of anchors of the format previously described, <start, stop, key phrase> is generated by the parser and stored within the table 409 under the external document domain.

Viewing External Documents

When a user views an external document on the display screen 37, the stored anchors are overlaid on top of the document such that it appears that the external document has been marked with hypertext. When the user clicks the switches 45 or 47 of the mouse 50 on a section of the external document display, the corresponding anchor is determined from the various start and stop coordinates. The OID of the key phrase corresponding to the anchor is stored within the anchor, and can be used for the purposes of retrieving the key phrase record or initiating a query as previously described.

Dynamic Hypertext

The present invention supports conventional Hypertext. Prior art Hypertext systems typically associate a region of text with a pointer to another record, as illustrated in FIG. 29. This creates a 'hard-coded' link between the source and the target. When s user clicks on the source region, the target record is loaded and displayed. If the target record is absent, the hypertext jump will fail, possibly with serious consequences.

The present system uses a new approach based on a dynamic association between records. In the preferred embodiment, each hypertext region such as region 540 is associated with a key phrase, not a normal record. When the user clicks the switches 45 or 47 of the mouse 50 on source region 541, all the records 542 associated with the key phrase are retrieved and ranked using any of the associative search techniques previously described. As illustrated in FIG. 30, the application can then display on the display screen 37 either the highest ranked item such as item 543, or present all the retrieved items and allow the user to pick the one to access.

In certain applications, the user may want to access a single 'default' item such as item 543. This item can be determined automatically, by picking the item at the top of the dynamically generated list, or manually, by letting the user pick the item explicitly and then preserving this choice in the anchor itself.

Annotations

The database of the present invention includes the ability to annotate and comment on any record, either by adding 'annotation' fields to an existing record, or by creating a new 'annotation' record that points to the original record. Unlike annotation mechanisms in the prior art, the annotation mechanism of the present invention is fully integrated into the database, and is available for indexing, to have hypertext, to be placed in folders, and so on.

The Generic Word Processor

The database of the present invention includes a novel Structured Word Processor that may be used in conjunction with table 409.

Figure 31A:
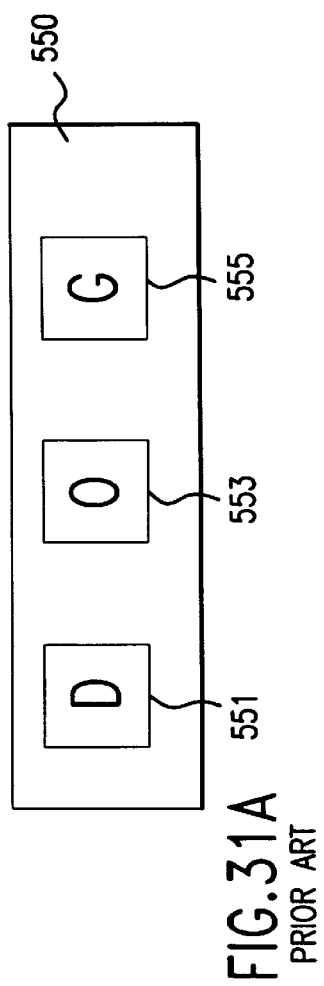
FIG. 31A illustrates a character and word box structure of the word processor of the present invention.
Figure 31B:
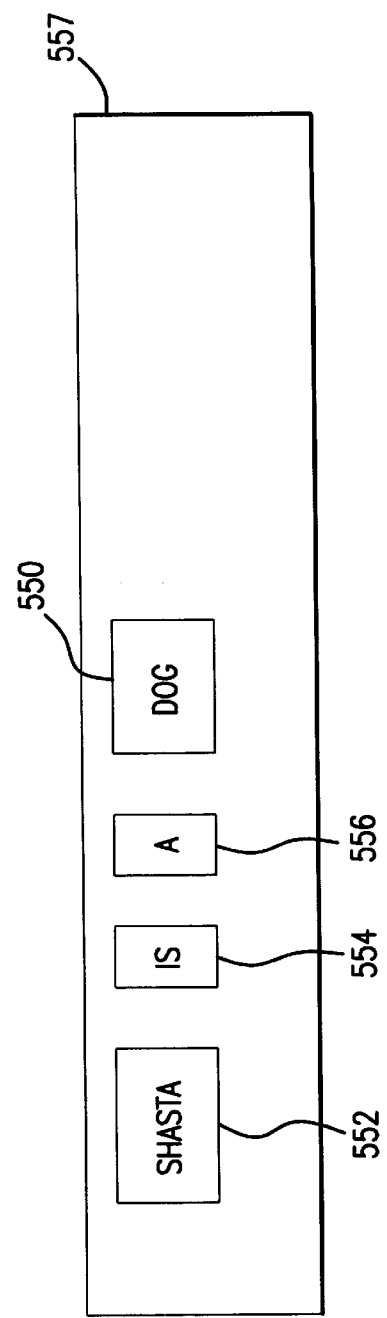
FIG. 31B illustrates the word and horizontal line box structure of the word processor of the present invention.
Figure 31C:
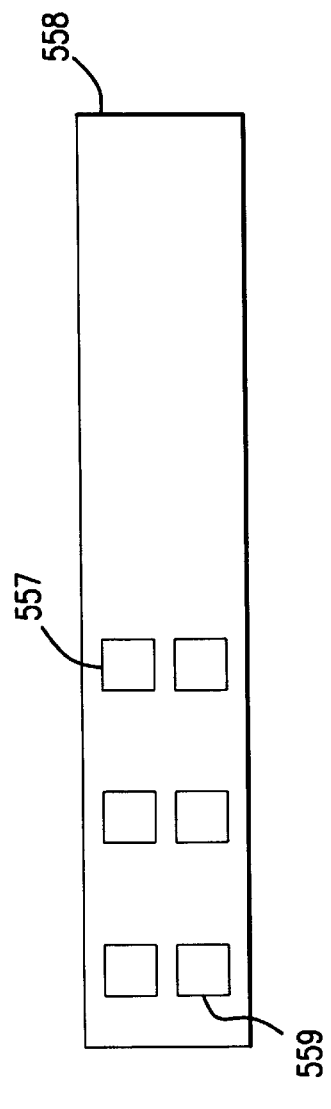
FIG. 31C illustrates the vertical box structure of the word processor of the present invention.

The structured word processor of the present invention uses the "boxes and glue" paradigm introduced by Donald Knuth in TEX. According to this paradigm, a page of text is created by starting with individual characters and concatenating the characters to form larger units, called "boxes," and then combining these boxes into yet larger boxes. FIG. 31A illustrates three character boxes 551, 553 and 555 concatenated to form a word box 550. FIG. 31B illustrates four word boxes 552, 554, 556 and the word box 550 combined to form a horizontal line box 557. Horizontal boxes are used for words and other text tokens that are spaced horizontally inside another box, such as a line (or column width). FIG. 31C illustrates the combination of the horizontal line box 557 with another horizontal line box 559 to form a vertical box 558. Vertical boxes are used for paragraphs and other objects that are spaced vertically inside other boxes, such as page height.

Boxes may be attached to other boxes with "glue." The glue can stretch or shrink, as needed. For example, in a justified sentence, the white space between words is stretched to force the words to line up at the right edge of the column. Glue can be used for between-character (horizontal) spacing, between-word (horizontal) spacing including "tab" glue, that "sticks" to tab markings. Glue may also be used for between-line (vertical) spacing and between-paragraph (vertical) spacing.

Figure 32:
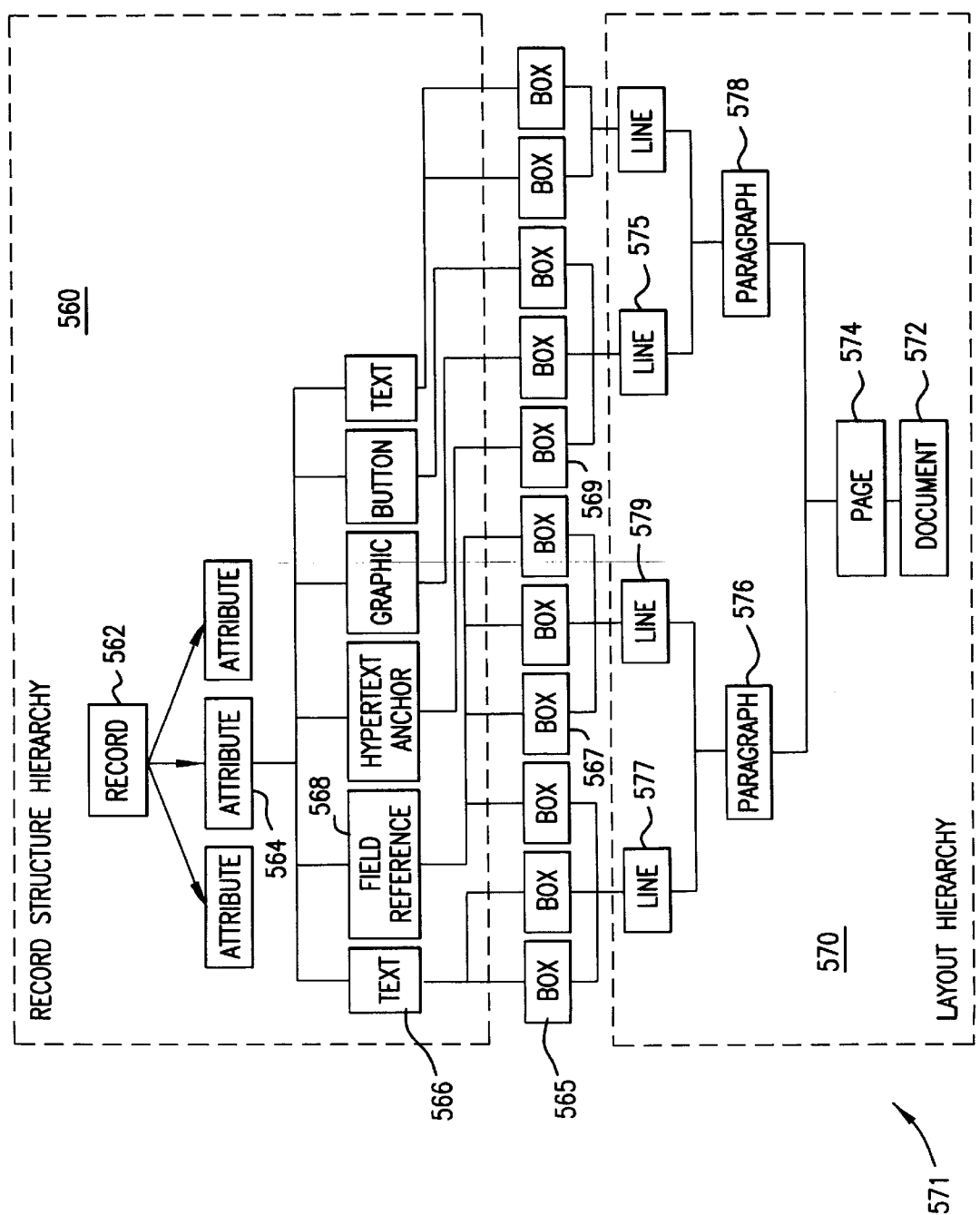
FIG. 32 illustrates the box tree structure of the word processor of the present invention.

When a record of the table 409 is edited, each word and field definition is converted into boxes. The system organizes these boxes into a tree structure of line boxes and paragraph boxes, as illustrated in FIG. 32. Shown there is a record hierarchy 560, corresponding to the hierarchy of a record, and a layout hierarchy 570, corresponding to the hierarchy of a layout such as a document generated according to the word processor described with reference to FIGS. 31A–31C. The record structure hierarchy 560 represents the record structure of the table 409 where a record 562 corresponds to a row in the table 409, and record 562 includes a plurality of attributes, including attribute 564, that correspond to the columns of the table 409. In turn, the attributes may include a variety of items. For example, the attribute 564 includes text, represented by block 566, field references represented by block 568 and other items as shown.

The layout hierarchy 570 comprises a document 572 which in turn comprises a plurality of pages such as page 574. Page 574 comprises a plurality of paragraphs including paragraphs 576 and 578 and paragraph 576 comprises a plurality of lines, including lines 577 and 579. Paragraph 578 includes line 579.

The word processor of the present invention allows the document 572 to be inserted into the record 562 by providing a plurality of boxes, including boxes 565, 567 and 569, common to both the record structure hierarchy 560 and the layout hierarchy 570. For example, the box 565 corresponds to part of the line 577 and comprises part of text 566 of attribute 564. Similarly, the box 567 corresponds to part of the line 579 and may comprise a field reference as indicated by block 568. Thus, the shared box structure as illustrated in FIG. 32 allows any type of word processing document to interface with any record in the table 409.

Conceptually, each box is kept as a bitmap, and its height and width are known, so the system displays the tree structure 571 by displaying all of the bitmaps corresponding to the boxes in the tree. If the tree is changed, for example, by adding a new word, only the new word box and a relatively small number of adjacent boxes need be recalculated. Similarly, line breaks or restructuring of a paragraph does not alter most of the word boxes, which may be reused, and only the lineboxes need be recalculated. To edit the tree structure 571 as illustrated in FIG. 32, a user may click a cursor on a part of the text. The system locates the word box or glue that is being edited by a recursively descending through the tree structure 571.

The word processor supports multiple fonts and special effects such as subscripts, dropcaps and other features including graphic objects. A word in a different font than a base font is in a different box and may have a different height from other boxes on a line. The height of a linebox the height of the largest wordbox within it. Effects within a word can be handled by breaking a word into subboxes with no glue between them. Again, the height of a wordbox is the height of the largest box within it. Graphic objects, such as bitmaps, may be treated and formatted as a fixed width box.

The word processor of the present invention may be used to edit records in the table 409. The text associated with each field in a record can be considered a "paragraph" for the purposes of inter-field spacing, text flow within a field, and other formatting parameters. Storing all the fields in the same way during text-editing allows the movement of text and "flow" to appear natural.

As previously described, the text being edited is divided into fields, with each field corresponding to a column in the underlying database. Unlike a traditional static data entry form, the positions and sizes of the attributes are not fixed but are dynamic and all the features of a word-processor such as fonts and embedded graphics are available to edit the record fields.

Similarly, all of the features of a database such as lookups and mailmerge are available to the word processor. All of the attributes that apply to data entry for a particular field are enforced by the word processor. Such attributes might include a mask (such as ###-###), existence requirements, range and value constraints, etc. The fields can be explicitly labelled, or hidden and implied.

The word processor of the present invention allows existing fields to be added by typing the prefix of a field name and pressing a button. The system then completes the rest of the field name automatically.

The word processor of the present invention supports other database features. For example, new fields can be created by a user by using a popup dialog box. Similarly, references to other records or important words can be added by a dialog box.

With particular regard to the table 409 of the present invention, OID references may support fields within other fields and a particular field within other fields supports the use of 'templates,' where a template is a list of field references embedded in text. For example, the template "Enter the first name here <fieldref id=firs.tName> and the last name here<fieldref id=lastName>" would appear to the user as "Enter the first name here: John and the last name here: Doe." Templates allow a user to build dynamic forms quickly and easily without having to use complicated form drawing tools.

Any set of fields or layout can be saved and reused as a named template. Such templates preserve all the formatting and layout of the fields, but contain no actual field data themselves. Instead they contain empty field references (as described above) which act as placeholders for data in the word-processor.

The user interface for the word processor of the present invention allows a user to switch between two modes of data entry. The word-processor of the present invention is used for flexible entry into one record at a time, while a columnar view is used for entering data in columns. The user can switch back and forth between these two views with no loss of data and switching from the word processor to the columnar view will cause the fields that were entered in the single item to become the columns to be displayed in the columnar view.

Finally, the 'fields within fields' that are apparent in the word processor view become separated into columns in a columnar view. The user can then make changes in columnar mode, and then, when switching back to the word processor view, the columns become combined once again.

Structured Email

A particular use of the present invention is to support the creation, automatic indexing, organization and retrieval of 'structured' email. Structured email is a variant of traditional email that stores fields and other structural information in the body of the message. As noted, the present invention supports the flexible data entry needed for email through the use of the word processor and templates, and brings to the management, indexing and retrieval of such email all the advantages described herein.

When used in conjunction with the distributed storage system described in the copending application entitled "Method and Apparatus for a Physical Storage Architecture for a Shared File Environment," filed Feb. 3, 1995, Ser. No. 08/384,706, and an email transport such as Simple Mail Transport Protocol (SMTP), the current invention provides an advantageous implementation of email.

Passwords

It is often required that access to particular data items be restricted to certain users. In order to apply these restrictions, an information management system must determine the identity of the user requesting access. This is currently done in two ways, physically measuring a unique quality of the uses of requesting information from the user, most current information management systems rely on the second approach, by using 'passwords'. However, to avoid security problems with a password system, three guidelines are applied to passwords:

a) the password should not be made of common words, because an aggressor can use a brute force approach and a dictionary to guess the password;

b) the password should be longer rather than shorter; and c) the password should be changed often, so that even if is stolen it will not be valid for long.

Finally, a password should never be written down or embedded into a login script and should always be interactive.

According to the present password system, a user's identity is determined through an extensive question and answer session. The responses to certain personal questions very quickly identify the user with high accuracy. Even an accurate mimic will eventually fail to answer correctly if the question and answer session is prolonged.

For example, sample questions might be: 'What is your favorite breakfast cereal?'; 'Where were you in April 1990?' 'What color is your toothbrush?'. These questions are wide ranging and hard to mimic. Furthermore, the correct responses are natural English sentences, with an extremely large solution space, so that a brute force approach is unlikely to be successful.

To improve the effectiveness of the response, an exact matching of user-response and stored answer is not required and 'fuzzy' and associativel matching can be used according to the synonym, thesaurus and other features of the present invention.

According to the password system of the present invention, the user creates the list of questions and corresponding answers, which are then stored. Because the user has complete control over the questions, the user may find the process of creating the questions and answers enjoyable, and as a result, change the questions and answer list more frequently, further enhancing system security.

According to the preferred embodiment, a user creates a list of 50–100 questions and answers that are encrypted and stored. The questions can be entirely new, or can be based on a large database of interesting questions. When the user logs on the system, the system randomly selects one of the questions related to that user and presents the question to the user. The user then types in a response, which is matched against the correct answer. The matching can be fuzzy and associative, as described above. If the response matches correctly, access is allowed.

In an alternate embodiment, more security may be provided by repeatedly asking questions until a certain risk threshold is reached. For example, if the answer to 'What color is your toothbrush?' is the single word 'Red', then brute force guessing may be effective in this one case. In this scenario, repeatedly asking questions will diminish the probability of brute force success.

Having now described the invention in accordance with the requirements of the patent statutes, those skilled in this art will understand how to make changes and modifications in the present invention to meet their specific requirements or conditions.

I claim:

1. A method for providing simultaneous access to a common file in memory configured according to a logical table on a computer network comprising at least one computer, said method including the steps of:

configuring an extensible logical table to include:
  a plurality of rows, each said row including an object identification number (OID) to identify each said row, each said row corresponding to a record of information;
  a plurality of columns intersecting said plurality of rows to define a plurality of cells, a cell being basic unit of storage, each said column including an OID to identify each said column;

wherein
  at least one row includes a fields cell having references to a plurality of labeled columns;

partitioning the logical table on said at least one computer to provide a first user with a first partition to store updates to files corresponding to said first user, the logical table at least partially inaccessible to a second user;

partitioning the logical table on said at least one computer to provide said second user with a second partition to store updates to files corresponding to said second user, the logical table at least partially inaccessible to said first user;

partitioning the logical table on said at least one computer to store selected updates from said first and second user partitions to create a first common partition such that said first and second users have associated partition chains comprising said first and second partitions, respectively, and said common partition;

storing first user update data in said first partition while maintaining common data unchanged, said first user update date corresponding to changes to said common data file by said first user;

storing second user update data in said second partition while maintaining common data unchanged, said second user update date corresponding to changes to said common data file by said second user;

selectively storing desired updates from said first and second user partitions in said first common partition; and providing each of said first and second users access to said first common partition.

* * * * *

UNITED STATES PATENT AND TRADEMARK OFFICE
CERTIFICATE OF CORRECTION

| | | |
|---|---|---|
| PATENT NO. | : 6,182,121 B1 | Page 1 of 1 |
| APPLICATION NO. | : 09/128922 | |
| DATED | : January 30, 2001 | |
| INVENTOR(S) | : Scott Wlaschin | |

It is certified that error appears in the above-identified patent and that said Letters Patent is hereby corrected as shown below:

Claim 1, Column 34, Line 20: after "rows to define a plurality of cells, a cell being" and before "basic" insert --the--.

Claim 1, Column 34, Line 46: delete "date" and insert --data-- therefor.

Claim 1, Column 34, Line 50: delete "date" and insert --data-- therefor.

Signed and Sealed this

Fourteenth Day of August, 2012

David J. Kappos
*Director of the United States Patent and Trademark Office*